United States Patent [19]

Tzikas et al.

[11] Patent Number: 5,023,325
[45] Date of Patent: Jun. 11, 1991

[54] FIBRE-REACTIVE DYES CONTAINING A SUBSTITUTED AMINOCARBONYL-PHENYLAMINO OR NAPHTHYLAMINO REACTIVE MOIETY

[75] Inventors: Athanassios Tzikas, Pratteln; Peter Aeschlimann, Allschwil, both of Switzerland

[73] Assignee: Ciba-Geigy Corporation, Ardsley, N.Y.

[21] Appl. No.: 191,845

[22] Filed: May 11, 1988

Related U.S. Application Data

[63] Continuation of Ser. No. 884,770, Jul. 11, 1986, abandoned.

[51] Int. Cl.$^5$ .................. C09B 62/04; C09B 62/503; D06P 3/10; D06P 3/66
[52] U.S. Cl. ......................... 534/618; 540/130; 540/131; 540/132; 544/76; 552/101; 552/104; 552/223; 552/225; 558/23; 558/25; 558/166; 564/154; 564/159; 564/166; 534/641; 534/642; 534/643; 534/617
[58] Field of Search .............................. 534/617–643

[56] References Cited

U.S. PATENT DOCUMENTS

| | | | |
|---|---|---|---|
| 3,128,267 | 4/1964 | Schmitz et al. | 534/643 X |
| 3,409,633 | 11/1968 | Springer | 260/314.5 |
| 3,503,953 | 3/1970 | Loffelman | 534/643 X |
| 4,248,773 | 2/1981 | Hurter et al. | 534/643 X |
| 4,602,084 | 7/1986 | Hurter | 534/643 X |

FOREIGN PATENT DOCUMENTS

| | | | |
|---|---|---|---|
| 144766 | 6/1985 | European Pat. Off. | 534/638 |
| 172789 | 2/1986 | European Pat. Off. | 534/641 |
| 1370455 | 7/1964 | France | 534/642 |
| 881536 | 11/1961 | United Kingdom | 534/643 |
| 1576237 | 10/1980 | United Kingdom | 534/638 |

*Primary Examiner*—Floyd D. Higel
*Attorney, Agent, or Firm*—Wenderoth, Lind & Ponack

[57] ABSTRACT

A reactive dye of the formula

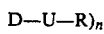

in which D is the radical of an anthraquinone, phthalocyanine, formazane, azomethine, dioxazine, phenazine, stilbene, triphenylmethane, xanthene, thioxanthone, nitroaryl, naphthoquinone, pyrenequinone or perylenetetracarbimide dye; U is —CO— or —SO$_2$—; R is a radical of the formula

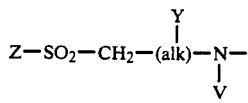

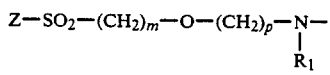

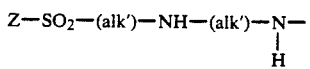

or

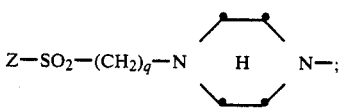

Z is sulfatoethyl, β-thiosulfatoethyl, β-phosphatoethyl, β-acetoxyethyl, β-halogenoethyl or vinyl; alk is a polymethylene radical having 1 to 6 C atoms or its branched isomers; Y is hydrogen, chlorine, bromine, fluorine, hydroxyl, sulfato, C$_1$–C$_4$-alkanoyloxy, cyano, carboxyl, alkoxycarbonyl having 1 to 5 C atoms, carbamoyl or a radical —SO$_2$—Z in which Z is as defined above; V is hydrogen or C$_1$–C$_4$-alkyl which is unsubstituted or substituted by carboxyl, sulfo, C$_1$–C$_2$-alkoxy, halogen or hydroxyl;
or a radical

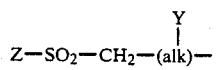

in which Z, alk and Y are as defined above; R$_1$ is hydrogen or C$_1$–C$_6$-alkyl; alk', independently of each other, are polymethylene radicals having 2 to 6 C atoms or their branched isomers; n is 1 to 4, m is 1 to 6, p is 1 to 6 and q is 1 to 6; where, when U is —SO$_2$—, V must not be hydrogen or D must not be a phthalocyanine dye radical.

8 Claims, No Drawings

FIBRE-REACTIVE DYES CONTAINING A SUBSTITUTED AMINOCARBONYL-PHENYLAMINO OR NAPHTHYLAMINO REACTIVE MOIETY

This application is a continuation of now abandoned application Ser No. 884,770, filed July 11, 1986.

The present invention relates to novel reactive dyes, to a process for their preparation and to their use for dyeing or printing fiber material.

The practice of dyeing with reactive dyes has recently led to increased demands on the quality of the dyeings and economics of the dyeing process. There consequently continues to be a demand for new reactive dyes which have improved properties, in particular application properties.

The present demand in the dyeing of cotton by the cold pad-batch method is for reactive dyes which have adequate substantivity at the low dyeing temperature and which also have good wash-off properties with respect to the unfixed portions. They should also have a high reactivity, so that only short batching times are necessary, and they should in particular produce dyeings having high degrees of fixation. These demands are met only inadequately by known dyes.

The present invention therefore has for its object to find new, improved reactive dyes for the cold pad-batch method which have the qualities characterized above to a high degree. The new dyes should be distinguished in particular by high degrees of fixation and high fiber-dye bond stabilities, and moreover the portions not fixed on the fiber should be easy to wash off. They should furthermore produce dyeings having good allround fastness properties, for example light and wet fastness properties.

It has been found that this object is achieved with the novel fiber-reactive dyes defined hereinafter.

The invention accordingly provides reactive dyes of the formula $$D-(U-R)_n \qquad (1)$$

in which D is the radical of an anthraquinone, phthalocyanine, formazane, azomethine, dioxazine, phenazine, stilbene, triphenylmethane, xanthene, thioxanthene, nitroaryl, naphthoquinone, pyrenequinone or perylenetetracarbimide dye; U is —CO— or —SO$_2$—; R is a radical of the formula $$Z-SO_2-CH_2-(alk)-N- \\ | \\ V$$

$$Z-SO_2-(CH_2)_m-O-(CH_2)_p-N- \\ | \\ R_1$$

$$Z-SO_2-(alk')-NH-(alk')-N- \text{ or} \\ | \\ H$$

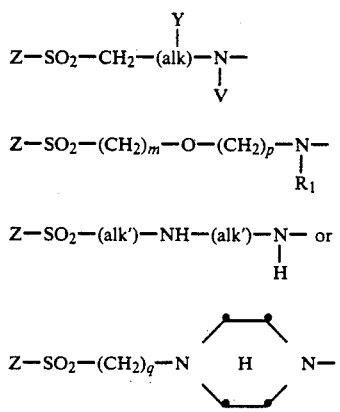

Z is sulfatoethyl, β-thiosulfatoethyl, β-phosphatoethyl, β-acetoxyethyl, β-halogenoethyl or vinyl; alk is a polymethylene radical having 1 to 6 C atoms or its branched isomers; Y is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl or a radical —SO$_2$—Z in which Z is defined as above;

V is hydrogen or an alkyl radical having 1 to 4 C atoms which can be substituted by carboxyl or sulfo groups or by their derivatives, alkoxy groups having 1 or 2 C atoms, halogen or hydroxyl;

or a radical

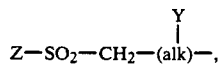

$$Z-SO_2-CH_2-(alk)-,$$

in which Z, alk and Y are as defined above; R$_1$ is hydrogen or C$_{1-6}$-alkyl; alk', independently of each other, are polymethylene radicals having 2 to 6 C atoms or their branched isomers; n is 1 to 4, m is 1 to 6, p is 1 to 6 and q is 1 to 6; where, when U is —SO$_2$—, V must not be hydrogen; except the reactive dyes of German Offenlegungsschrift 1,934,047.

The radical D in the formula (1) can contain, bonded to its basic structure, the substituents customary with organic dyes.

Examples of further substituents in the radical D are alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, hydroxyl, carboxyl, sulfomethyl and sulfo. Preferably the radical D contains one or more sulfo acid groups. Suitable further substituents on the radical D are, in particular, methyl, ethyl, methoxy, ethoxy, acetylamino, benzoylamino, amino, chlorine, bromine, ureido, hydroxyl, carboxyl, sulfomethyl or sulfo.

A suitable β-halogenoethyl for Z is in particular a β-chloroethyl radical. The polymethylene radical alk is preferably methylene, ethylene, methylmethylene, propylene or butylene. An acyloxy radical Y is in particular ethyloxy, propionyloxy or butyryloxy, and an alkoxycarbonyl radical Y is in particular methoxycarbonyl, ethoxycarbonyl or propyloxycarbonyl. An alkyl radical V can be methyl, ethyl, propyl, isopropyl, isobutyl, sec-butyl or tert-butyl. Derivatives of the carbxyl or sulfo groups are for example carbamoyl, N-methyl-, N-ethyl-, N,N-dimethyl- and N,N-diethyl-carbamoyl, cyano, acetyl, propionyl, butyryl, methoxycarbonyl, ethoxycarbonyl, propyloxycarbonyl, sulfamoyl, N-methyl-, N-ethyl-, N,N-dimethyl- and N,N-diethyl-sulfamoyl, methylsulfonyl, ethylsulfonyl and propylsulfonyl. The radical $R_1$ is for example methyl, ethyl, propyl, isopropyl, butyl, isobutyl, sec.-butyl, tert.-butyl, pentyl or hexyl, or preferably hydrogen. The polymethylene radicals alk' are preferably ethylene, propylene or butylene. The indices m, p and q are independently of one another and preferably 2, 3 or 4. The index n is preferably 1 or 2, in particular when D is a phthalocyanine radical, but also 3 or 4.

Also possible are reactive dyes of the formula (1) in which the radical D additionally includes a further reactive radical. The additional reactive radicals included in D can be bonded to D via amino groups or in some other way, for example by a direct bond.

Preference is given to reactive dyes of the formula

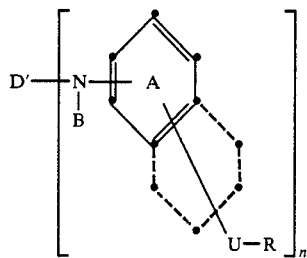

(2)

in which D' is a dye radical defined in the same way as D in the formula (1) and B is hydrogen or alkyl having 1 to 4 carbon atoms which can be substituted by carboxyl, sulfo, cyano or hydroxyl; U, R and n are as defined underneath the formula (1); and the benzene or naphthalene radical A can contain further substituents.

An alkyl radical B is straight-chain or branched; it can be further substituted, for example by halogen, hydroxyl, cyano, $C_{1-4}$-alkoxy, carboxyl or sulfo. Examples of B are the following radicals: methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, γ-chloroethyl, β-bromopropyl, β-hydroxyethyl, hydroxybutyl, β-cyanoethyl, sulfomethyl and β-sulfoethyl. Preferably B is hydrogen, methyl or ethyl. Suitable further substituents on the benzene or naphthalene radical A are the same as mentioned above in the explanation of the radical D.

Preference is given in particular to reactive dyes of the formula

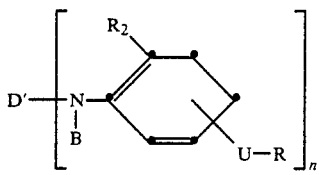

(3)

in which $R_2$ is hydrogen, $C_{1-4}$-alkyl, $C_{1-4}$-alkoxy, halogen, hydroxyl, carboxyl or sulfo; and D', B, U, R and n are as defined underneath the formula (2).

Preference is given also to reactive dyes of the formula (2) or (3) in which D' is the radical of an anthraquinone dye.

Suitable reactive dyes are in particular those of the formula (2) or (3) in which D' is the radical of an anthraquinone dye of the formula

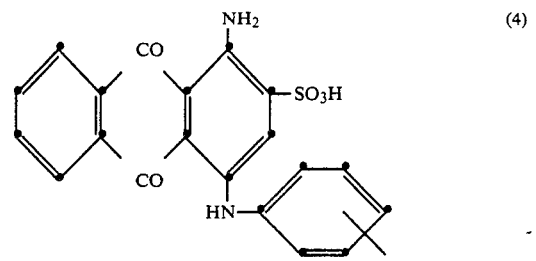

(4)

where the anthraquinone nucleus can be substituted by a further sulfo group and the phenylene radical by alkyl having 1 to 4 C atoms, alkoxy having 1 to 4 C atoms, halogen, carboxyl or sulfo, and the dye preferably contains at least 2 highly water-solubilizing groups.

Preference is also given to reactive dyes of the formula (2) or (3) in which D' is the radical of a phthalocyanine dye.

Suitable reactive dyes are in particular those of the formula (3) in which D' is the radical of a phthalocyanine dye of the formula

(5)

Pc is the radical of a copper or nickel phthalocyanine; W is —OH and/or —$NR_3R_4$; $R_3$ and $R_4$, independently of each other, are hydrogen or alkyl having 1 to 4 carbon atoms which can be substituted by hydroxyl, alkoxy, hydroxylalkoxy, sulfo, sulfato or sulfatoalkoxy, or in which —$NR_3R_4$ is a morpholino radical; and n is as defined for the formula (3).

Preference is given in particular to compounds of the formulae (1) to (3) in which Z is a β-sulfatoethyl, β-chloroethyl or vinyl group.

The formula (1) part which is enclosed in round brackets and the formula (2) or (3) part which is enclosed in square brackets is a reactive radical which can be present in the molecule once to four times. The reactive radicals can be identical or different; preferably the radicals are identical. The reactive radical contains a substituent which is or contains a fiber-reactive leaving group, for example when Z is β-chloroethyl, or which can become active in the manner of fiber-reactive leaving groups, for example when Z is vinyl. Fiber-reactive compounds are to be understood as meaning those which are capable of reacting with the hydroxyl groups of cellulose, the amino, carboxyl, hydroxyl and thiol groups in the case of wool and silk, or with the amino and, possibly, carboxyl groups of synthetic polyamides to form covalent chemical bonding.

A process for preparing reactive dyes of the formula (1) comprises reacting a dye of the formula

D—(u—Cl)$_n$ (6)

with an amine of the formula

H—R (7)

in the desired molar ratio to give reactive dyes of the formula (1) and, if desired, following up with a further conversion reaction.

A modified embodiment of the process comprises first preparing a dye which contains a precursor of the reactive radical and subsequently converting this precursor into the final stage, for example by esterification or an addition reaction. It is possible for example to prepare a dye in which Z is an HO—CH$_2$CH$_2$—SO$_2$-radical and to react the intermediate with sulfuric acid before or after the acylation, so that the hydroxyl group is converted into a sulfato group; or to use an analogous dye in which Z is an H$_2$C=CH—SO$_2$— group and to add thiosulfuric acid onto the intermediate to form an HO$_3$SS—CH$_2$CH$_2$—SO$_2$ radical. The sulfation of the hydroxyl group in a dye of the formula (1) or in a suitable precursor is effected for example by reacting with concentrated sulfuric acid at 0° C. to moderately elevated temperature. The sulfation can also be effected by reacting the hydroxyl compound with two equivalents of chlorosulfonic acid per hydroxyl group in a polar organic solvent, for example N-methylpyrrolidone, at 10° to 80° C. Preferably the sulfation is effected by adding the compound in question to sulfuric acid monohydrate at temperatures between 5° and 15° C. The introduction of another radical for Z in a compound of the formula (1) or in an intermediate in place of a halogen atom or a sulfato group, for example a thiosulfone, or phosphato group is effected in a manner known per se.

In addition it is possible to carry out the synthesis with elimination reactions. For example, reactive dyes of the formula (1) which contain sulfatoethylsulfonyl radicals can be treated with agents which split off hydrogen halide, such as sodium hydroxide, and the sulfatoethylsulfonyl radicals turn into vinylsulfonyl radicals.

If desired, it is possible to use a process variant where starting materials are dye precursors. This variant is suitable for preparing reactive dyes of the formula (1) in which D is the radical of a dye which is composed of two or more than two components, for example of an anthraquinone dye of the bromamine acid series, of a copper or nickel phthalocyanine, or of a copper-formazan. In principle, the reactive dyes of the formula (1) of all dye classes can be prepared in a manner known per se or analogously to known procedures by starting from precursors or intermediates for dyes which contain fiber-reactive radicals as per the formula (1), or by introducing these fiber-reactive radicals into intermediates which are suitable for this purpose and have dye character.

A process for preparing reactive dyes of the formula (2) comprises condensing a dye of the formula $$D'—X)_n \qquad (8)$$

in which X is a halogen atom, with an amine of the formula

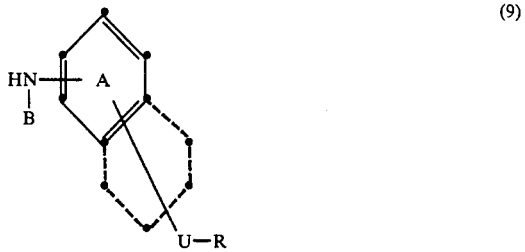

(9)

in which B is hydrogen or alkyl having 1 to 4 carbon atoms which can be substituted by carboxyl, sulfo, cyano or hydroxyl; and the benzene or naphthalene radical A can contain further substituents. The symbols D', n, U and R are as defined underneath the formula (2).

The preferred process for preparing the reactive dyes of the formula (3) comprises condensing a dye of the formula (8) with an amine of the formula

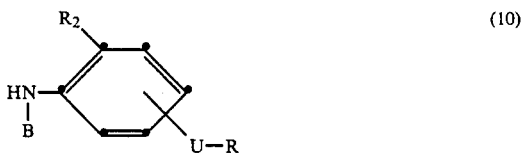

(10)

to give a reactive dye of the formula (3). The radical B, U, R and $R_2$ are as defined indicated underneath the formula (3).

Examples of amines of the formula (10) are: 1-β(β'-chloroethylsulfonyl)-ethylcarbamoyl-3-aminobenzene, 1-β(β'-chloroethylsulfonyl)-ethylcarbamoyl-4-chloro-3-aminobenzene, 1-β(β'-chloroethylsulfonyl)-ethylcarbamoyl-4-methyl-3-aminobenzene, 1-β(β'-chloroethylsulfonyl)-ethylcarbamoyl-4-methoxy-3-aminobenzene, 1-β[β'-(β''-chloroethylsulfonyl)ethyloxy]-ethylcarbamoyl-3-aminobenzene, 1-γ-(β'-chloroethylsulfonyl)-propylcarbamoyl-3-aminobenzene, 1-bis-[β-(β'-chloroethylsulfonyl)-ethyl]-carbamoyl-3-aminobenzene, 1-bis-[γ-(β'-chloroethylsulfonyl)-propyl]-carbamoyl-3-aminobenzene, 1-β-(β'-chloroethylsulfonyl)-ethylcarbamoyl-3-N-ethylaminobenzene, 1-β-(β'-chloroethylsulfonyl)-ethyl-carbamoyl-3-N-isopropylaminobenzene, 1-γ-(β'-chloroethylsulfonyl)-propylcarbamoyl-3-N-isopropylaminobenzene, 1-β-(β'-chloroethylsulfonyl)-ethylcarbamoyl-4-aminobenzene, 1-β-[β'-(β''-chloroethylsulfonyl)-ethyloxy]-ethylcarbamoyl-4-aminobenzene, 1-γ-(β'-chloroethylsulfonyl)-propylcarbamoyl-4-aminobenzene, 1-bis-[β-(β'-chloroethylsulfonyl)-ethyl]-carbamoyl-4-aminobenzene, 1-bis-[γ-(β'-chloroethylsulfonyl)propyl]-carbamoyl-4-aminobenzene, 1-β-(β'-chloroethyllsulfonyl)-ethylcarbamoyl-4-N-ethylaminobenzene, 1-γ-(β'-chloroethylsulfonyl)-propylcarbamoyl-4-N-isopropylaminobenzene, 1-β-(vinylsulfonyl)-ethylcarbamoyl-4-aminobenzene, 1-bis-[β-(vinylsulfonyl)-ethyl]-carbamoyl-4-aminobenzene, 1-δ-(β'-chloroethylsulfonyl)-butylcarbamoyl-4-aminobenzene, 1-bis-[β-(β'-chloroethylsulfonyl)-ethyl]-carbamoyl-4-chloro-3-aminobenzene, 1-bis-[β-(β'-chloroethylsulfonyl)-ethyl]carbamoyl-4-methyl-3-aminobenzene, 1-bis-[γ-(β'-chloroethylsulfonyl)-propyl]-carbamoyl-4-methoxy-3-aminobenzene, 1-δ-(β'-chloroethylsulfonyl)-butylcarbamoyl-3-aminobenzene, 1-β-[β'-(β''-chloroethylsulfonyl)-ethyloxy]-ethylcarbamoyl-3-aminobenzene, 1-β-(β'-chloroethylsulfonyl)-ethylcarbamoyl-4-hydroxy-3-aminobenzene, 1-bis-[β-(β'-chloroethylsulfonyl)ethyl]-4-hydroxy-3-aminobenzene, 1-bis-[β-(β'-chloroethylsulfonyl)-ethyl]-carbamoyl-4-methoxy-3-aminobenzene, and corresponding compounds in which the β-chloroethylsulfonyl group is replaced by β-sulfatoethylsulfonyl or vinylsulfonyl; also suitable are: 1-β-(β'-chloroethylsulfonyl)-ethylcarbamoyl-4-amino-3-sulfobenzene, 1-β-(β'-sulfatoethylsulfonyl)ethylcarbamoyl-4-amino-3-sulfobenzene, 1-β-vinylsulfonylethylcarbamoyl-4-amino-3-sulfobenzene, 1-β-vinylsulfonylethylcarbamoyl-3-amino-2-sulfobenzene, 1-β(β'-sulfatoethylsulfonyl)-ethylcarbamoyl-3-amino-4-methoxybenzene, 1-bis-(β-vinylsulfonylethyl)-carbamoyl-4-amino-3-sulfobenzene, 1-bis-[β-(β'-sulfatoethylsulfonyl)-ethyl]-carbamoyl-3-amino-4-methoxybenzene, 1-bis-(β-vinylsulfonylethyl)-carbamoyl-3-amino-2-sulfobenzene, 1-(3-amino-4-methoxybenzoyl)-N'-(γ-vinylsulfonylpropyl)piperazine, 1-bis(β-vinylsulfonylethyl)carbamoyl-4-amino-3-methoxybenzene, 1-β-(β'-vinylsulfonyl)ethylamino)-ethylcarbamoyl-3-aminobenzene, 1-(3-amino-4-methylbenzoyl)-N'-(β-vinylsulfonylethyl)-piperazine, 1-bis-[β-(β'-sulfatoethylsulfonyl)-ethyl]-carbamoyl-4-amino-3-sulfobenzene, 1-bis-(β-vinylsulfonylethyl)carbamoyl-3-amino-4-methoxybenzene, 1-(β-vinylsulfonylethyl)-carbamoyl-3-amino-4-methoxybenzene, 1-(4-amino-3-sulfobenzoyl)-N'-(γ-vinylsulfonylpropyl)-piperazine, 1-β(β'-vinylsulfonylethylamino)ethylcarbamoyl-4-amino-3-sulfobenzene, 1-β-(β'-sulfatoethylsulfonyl)-ethylcarbamoyl-3-amino-4-methylbenzene, 1-bis-[β-(β'-chloroethylsulfonyl)-ethyl]-carbamoyl-4-amino-3-sulfobenzene, 1-(4-amino-3-sulfobenzoyl)-N'-(β-vinylsulfonylethyl)piperazine, 1-β-(β'-vinylsulfonylethylamino)-ethylcarbamoyl-4-amino-3-sulfobenzene, 5-amino-1,3-bis(β-vinylsulfonylethylcarbamoyl)benzene, 1-β-(β'-vinylsulfonylethyloxy)-ethylcarbamoyl-4-amino-3-sulfobenzene.

The condensations of the dye of the formulae (6) or (8) with the amines of the formulae (7) on the one hand and (9) or (10) on the other are preferably effected in aqueous solution or suspension at low temperatures and at a weakly acid, neutral or weakly alkaline pH. Advantageously the hydrogen halide liberated in the course of the condensation is continuously neutralized by adding aqueous alkali metal hydroxides, carbonates or bicarbonates. The amines of the formulae (9) and (10) are used in the form of the free amines or their salts, preferably in the form of hydrochloride. The reaction is carried out at temperatures between about 0° and 40° C., preferably between 5° and 25° C., in the presence of acid-binding agents, preferably sodium carbonate, within a pH range from 2 to 8, preferably 5 to 6.5.

If groups capable of metal complex formation, such as hydroxyl, carboxyl, amino or sulfo, are present in the reactive dyes prepared, the reactive dyes can also be subsequently metallized. Important dye radicals D and D', in addition to those previously mentioned of the formulae (4) and (5), are for example

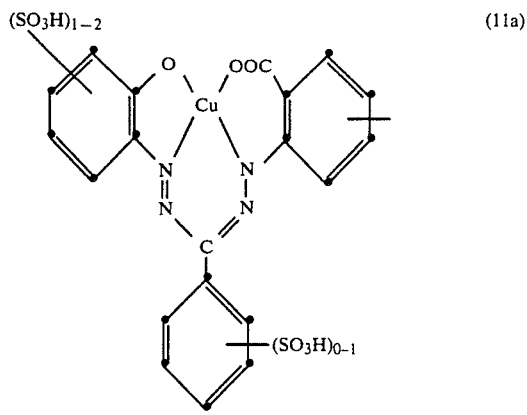

(11a)

or

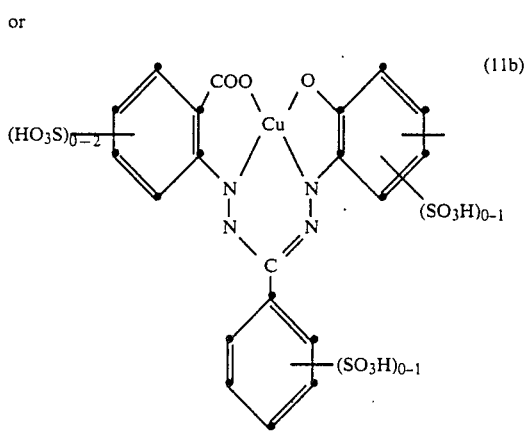

(11b)

in which the benzene nuclei can be further substituted by alkyl having 1 to 4 C atoms, alkoxy having 1 to 4 C atoms, alkylsulfonyl having 1 to 4 C atoms, halogen or carboxyl;

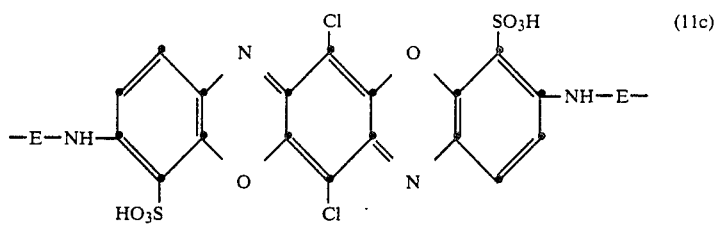

(11c)

in which E is a phenylene radical which can be substituted by alkyl having 1 to 4 C atoms, halogen, carboxyl or sulfo; or is an alkylene radical having 2 to 6 C atoms; and the outer benzene rings in the formula (11c) can be further substituted by alkyl having 1 to 4 C atoms, alkoxy having 1 to 4 C atoms, acetylamino, nitro, halogen, carboxyl or sulfo.

Any additional reactive radical included in D or D₁ is in particular a low molecular weight alkanoyl or alkylsulfonyl radical which is substituted by a detachable atom or a detachable group; a low molecular weight alkenoyl or alkenesulfonyl radical which can be substituted by a detachable atom or a detachable group; a carbocyclic or heterocyclic radical which contains 4-, 5- or 6-rings and is bonded via a carbonyl or sulfonyl group and substituted by a detachable atom or a detachable group; or a triazine or pyrimidine radical which is bonded directly via a carbon atom and substituted by a detachable atom or a detachable group; or contains such a radical. Examples of such reactive radicals are a six-membered heterocyclic radical which is bonded via an amino group and contains halogen atoms, such as a halogenotriazine or a halogenopyrimidine or an aliphatic acyl radical, such as a halogenoacetyl or halogenopropionyl radical.

The invention further provides the compounds of the formula

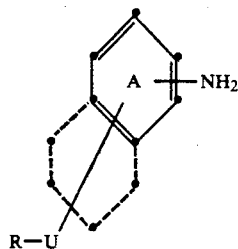

(12)

which U, R and A are as defined under the formula (2).

The compounds of the formula (12) can be prepared by condensing the corresponding aminobenzoyl or aminonaphthoyl chlorides with amines which conform to the radicals of the formula (1a) to (1d); or by starting from a nitrobenzoyl or nitronaphthoyl chloride, condensing with the amine, and reducing the nitro group to the amino group. By another method, described in German Offenlegungsschrift 2,040,620, the acid chloride can be reacted with an unsaturated aliphatic amine and 2-mercaptoethanol can be added on to the double bond of the acid amide at temperatures between 50° C. and 180° C. using catalytic amounts of a free radical producer or of sulfur. The resulting hydroxyethyl thioether compounds can also be prepared by condensing the acid chloride with a halogenoalkylamine and heating the condensation product with 2-mercaptoethanol and sodium alcoholate in alcohol. The thioether compounds are then additionally oxidized to the corresponding sulfones.

The oxidation of the thioether compounds to the sulfones can be effected by various methods, for example with hydrogen peroxide with or without the presence of tungsten or vanadium compounds as catalysts, and also with peracetic acid, potassium permanganate or chromic acid, or with chlorine/hydrochloric acid in each case in an aqueous, aqueous organic or organic medium.

The carboxamides thus obtainable, in which the grouping —SO$_2$—Z is a β-hydroxyethylsulfonyl group, can be converted by treatment with sulfating agents, phosphorylating agents, halogenating agents, alkylsulfonic or arylsulfonic acid halides, alkyl- or aryl-carboxylic acid halides or alkyl- or aryl-carboxylic anhydrides into the corresponding dye precursors in which the —SO$_2$—Z grouping is a —SO$_2$—CH$_2$—CH$_2$—O—SO$_3$H, —SO$_2$—CH$_2$—CH$_2$—O—PO$_3$H$_2$, —SO$_2$—CH$_2$—CH$_2$-halogen or —SO$_2$—CH$_2$—CH$_2$—O-acyl grouping. The products thus obtained can in turn be converted by treatment with alkalizing agents, for example alkali metal hydroxide or alkali metal carbonate, such as sodium hydroxide or sodium carbonate, into corresponding compounds in which the —SO$_2$—Z grouping is a —SO$_2$—CH= CH$_2$ grouping. The products thus obtained can in turn be converted by reaction (addition) with salts of thiosulfuric acid, such as sodium thiosulfate, with dialkylamines, such as di-methylamine or diethylamine, or with phenol into compounds in which the —SO$_2$—Z grouping is a —SO$_2$—CH$_2$—CH$_2$—S—SO$_3$H, —SO$_2$—CH$_2$—CH$_2$-N(alkyl)$_2$ or

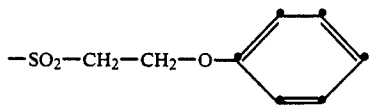

grouping.

Suitable sulfating agents are herein for example concentrated sulfuric acid and also chlorosulfonic acid and amidosulfonic acid or other compounds which give off sulfur trioxide. Suitable phosphorylating agents are herein for example concentrated phosporic acid, pyrophosphoric, metaphosphoric or polyphosphoric acid, alkyl polyphosphates, phosphorus oxychloride or mixtures of phosphoric acid and phosphorus(V) oxide. Suitable halogenating agents are for example thionyl chloride or thionyl bromide.

Preference is given to compounds of the formula

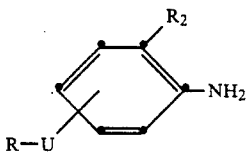

(13)

in which R is a radical of the formula

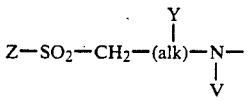

(13a)

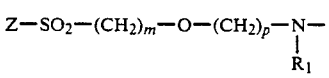

(13b)

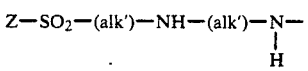

(13c)

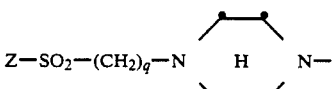

(13d)

U, Z, alk, A, V, R$_1$, alk', m, p and q are as defined underneath the formula (1); and R$_2$ is hydrogen, C$_{1-4}$-alkyl, C$_{1-4}$alkoxy, halogen, hydroxyl, carboxyl or sulfo; except the compounds of German Offenlegungsschrift 2,040,620.

The preferred process for preparing the compounds of the formula (13) comprises condensing a nitrobenzoyl chloride of the formula

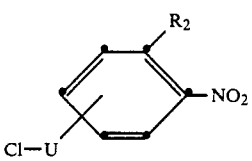

(14)

with an amine of the formula

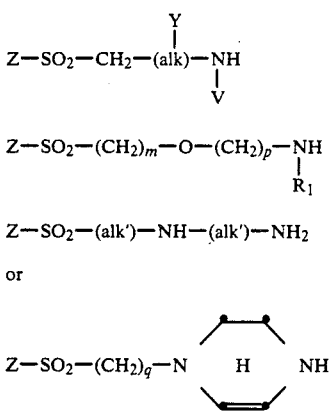

$$Z-SO_2-CH_2-(alk)-NH \atop | \atop V \quad (15)$$

$$Z-SO_2-(CH_2)_m-O-(CH_2)_p-NH \atop | \atop R_1 \quad (16)$$

$$Z-SO_2-(alk')-NH-(alk')-NH_2 \quad (17)$$

or

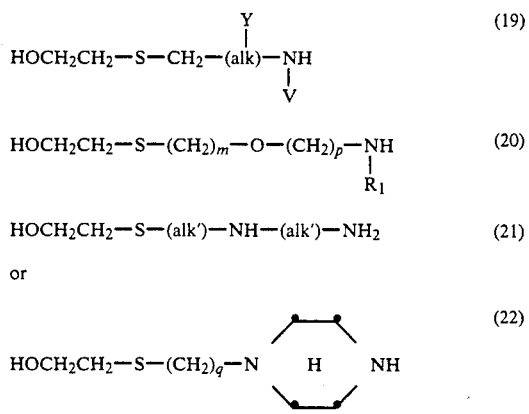

$$Z-SO_2-(CH_2)_q-N\underset{\diagdown\_\_\diagup}{\overset{\diagup\overline{\phantom{xx}}\diagdown}{\phantom{xxx}}}NH \quad (18)$$

and reducing the nitro group to an amino group.

The reaction is preferably carried out in a high-boiling organic solvent, for example nitrobenzene. The reduction of the nitro group to the amino group is effected in a manner known per se by catalytic hydrogenation with Pd/carbon in ethanol, ethyl acetate or tetrahydrofuran at room temperature up to about 40° C. The reduction can also be carried out with Fe/hydrochloric acid or Fe/acetic acid in aqueous solution.

In a modification of the process described above, compounds of the formula (13) can also be prepared by condensing a nitrobenzoyl chloride of the formula (14) with an amine of the formula $$HOCH_2CH_2-S-CH_2-(alk)-NH \atop | \atop V \quad (19)$$

$$HOCH_2CH_2-S-(CH_2)_m-O-(CH_2)_p-NH \atop | \atop R_1 \quad (20)$$

$$HOCH_2CH_2-S-(alk')-NH-(alk')-NH_2 \quad (21)$$

or $$HOCH_2CH_2-S-(CH_2)_q-N\underset{\diagdown\_\_\diagup}{\overset{\diagup\overline{\phantom{xx}}\diagdown}{\phantom{xxx}}}NH \quad (22)$$

oxidizing the condensation product with elemental chlorine to the corresponding β-chloroethylsulfonyl compound and reducing the nitro group to the amino group.

The condensation of the nitrobenzoyl chloride with the amines of the formulae (19) to (22) is carried out for example in chloroform at room temperature and in the presence of alkaline, acid-binding agents, for example alkali metal hydroxides, carbonates or bicarbonates. The condensation product is subsequently oxidized in a manner known per se with a chlorine/hydrochloric acid mixture. The reduction of the nitro group to the amino group is effected as described above.

The amines of the formulae (15) to (22) used as starting compounds can be prepared analogously to the process of Example 1 of German Offenlegungsschrift 2,614,550.

The reactive dyes of the formula (1) are suitable for dyeing and printing a very wide variety of materials, such as silk, leather, wool, polyamide fibers and polyurethanes, and in particular cellulose-containing fiber materials of any kind. These fiber materials are for example the natural cellulose fiber, such as cotton, linen and hemp, and wood pulp and regenerated cellulose. The reactive dyes of the formula (1) are also suitable for dyeing or printing hydroxyl-containing fibers which are contained in blend fabrics, for example blends of cotton with polyester fibers or polyamide fibers.

The dyes according to the invention can be applied to the fiber material and be fixed on the fiber in various ways, in particular in the form of aqueous dye solutions and print pastes. They are suitable not only for the exhaust method of dyeing but also for dyeing by the pad dye method, whereby the cloth is impregnated with aqueous dye solutions which can, if desired, also contain salt, and the dyes are fixed after an alkali treatment or in the presence of alkali, if desired, with heating. They are particularly suitable for the so-called cold pad-batch method, whereby the dye is applied together with the alkali on a pad-mangle and is then fixed by storing at room temperature for a plurality of hours. After fixing, the dyeings or prints are thoroughly rinsed with cold and hot water, if desired in the presence of an agent which acts like a dispersant and promotes the diffusion of the unfixed portions.

If the reactive dyes of the formula (1) in which D is the radical of an anthraquinone dye are insufficiently soluble in the alkaline dyeing liquor, this defect can be overcome in the way known from the literature by adding dispersants or other uncolored compounds, for example a naphthalenesulfonic acid/formaldehyde condensate or in particular anthraquinone-2-sulfonic acid.

The reactive dyes of the formula (1) are distinguished by high reactivity, good fixing properties and very good build-up properties. They can therefore be used in the exhaust dyeing method at low dyeing temperatures and only require short steaming times in the pad-steam method. The degrees of fixation are high, and the unfixed portions can be readily washed off, the difference between the degree of exhaustion and the degree of fixation being remarkably small, i.e. the hydrolysis loss being very low. The reactive dyes of the formula (1) are also particularly suitable for printing, especially on cotton, but also for printing nitrogen-containing fibers, for example wool, silk or wool-containing blend fabrics.

The dyeings and prints on cellulose fiber materials prepared with the dyes according to the invention have a high tinctorial strength and a high fiber-dye bond stability not only in the acid but also in the alkaline range, as well as a good light fastness and very good wet fastness properties, such as wash, water, seawater, cross-dyeing and perspiration fastness properties, and a good pleating fastness, hot press fastness and crock fastness.

The following examples serve to illustrate the invention. The temperatures are given in degrees celsius, and parts and percentages are by weight unless otherwise stated. Parts by weight relate to parts by volume as the kilogram relates to the liter.

EXAMPLE 1

11.5 parts of 1-amino-2-sulfo-4-bromoanthraquinone and 9.0 parts of 3-amino1-β-(β'-hydroxyethylsulfonyl)-ethyl carbamoyl benzene are suspended with 120 parts of water.

26 parts of sodium hydrogencarbonate are sprinkeled in at room temperature, and the suspension goes to pH 8.5. The suspension is heated to 75° C. At 70° to 75° C. 12 portions of 0.3 part of copper powder/copper(I) chloride 1:1 are added in the course of 3 hours. The reaction is complete after a further hour at 75° C. The suspension is cooled down to room temperature, which is followed by salting out with 13 g of sodium chloride ( 10 percent by volume) and filtering off.

To prepare the sulfuric acid ester, the thoroughly dried dye is added to three times the amount by weight of sulfuric acid monohydrate and stirred until completely dissolved. The dye solution is then poured onto ice, and the ester dye precipitates out. It is filtered off, is then suspended in a mixture of ice/water and, after neutralizing with calcium carbonate by sprinkling in potassium chloride, is filtered off and dried.

The reactive dye formed has the formula

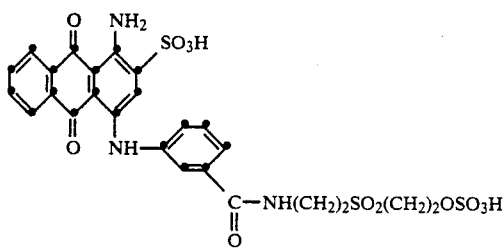

and dyes cotton in sky blue shades.

This dye, if used in accordance with dyeing method IV, becomes sparingly soluble when the alkali is added, owing to the resulting vinylation, which results in lower degrees of fixation. However, excellent dyeing results with the use of fixation are obtained on using the dye as a formulation which is composed as follows:

6.3 parts of the dye of the formula indicated above,
2.4 parts of naphthalenesulfonic acid/formaldehyde dispersant and
1.3 parts of anthraquinone-2-sulfonic acid, from which the dispersant can, if desired, also be omitted.

Analogously, all the following anthraquinone dyes of low solubility can be used in the pad-dyeing method.

The method of Example 1 can be used to synthesize the following dyes.

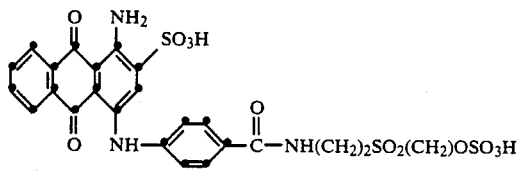

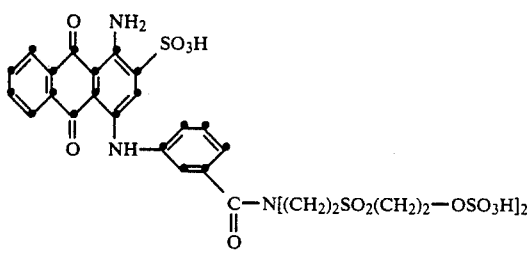

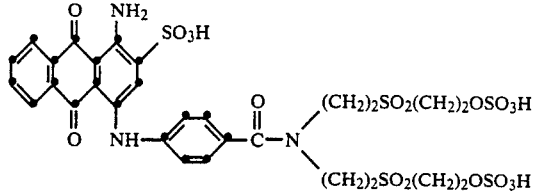

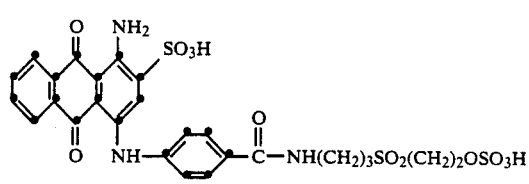

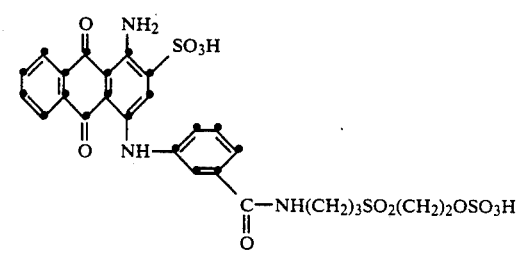

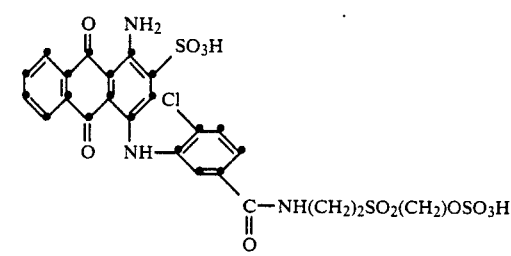

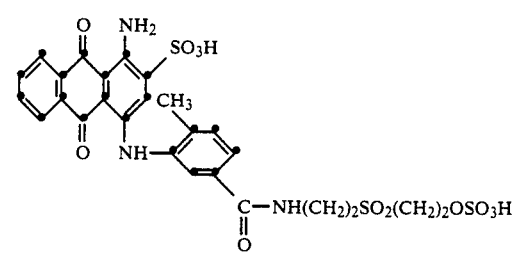

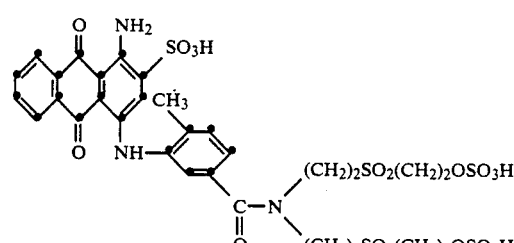

EXAMPLE 2

300 parts of chlorosulfonic acid are presented at room temperature.

36 parts of copper phthalocyanine are then added a little at a time in the course of one hour. The temperature is then slowly raised to 110° C. in the course of two hours. The temperature is raised to 135° C. in the course of one hour. While stirring thoroughly, the reaction solution is maintained at 130° to 135° C. for 6 1/2 hours and is then cooled down to room temperature and discharged onto an ice/water mixture; final volume 2.5 liters.

37 parts (1.5 percent by volume) of sodium chloride are added, which is followed by filtering. The filter cake is washed with ice-water (1.5% of NaCl) until neutral to Congo red.

The 250 parts of paste are suspended with 800 parts of ice-water; pH 2.5 to 3.0. A solution of 56 parts of 3-amino-1-$\beta$-($\beta'$-chloroethylsulfonyl)ethylcarbamoylbenzene hydrochloride, dissolved in 200 parts of water, is then added; pH of about 2.0.

The pH is slowly raised to 5.0 to 5.5 with 20 parts of concentrated ammoniacal solution, while the temperature is gradually raised to 25° C.

The reaction is completed by stirring at 50° C. for six hours while the pH is maintained at 5.0 with 2N ammonia.

The dye of the following formula

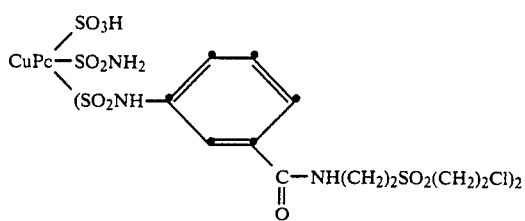

is salted out with 120 parts of sodium chloride (5 percent by volume). The dye dyes cotton in turquoise shades.

The same method can be used to synthesize the following dyes:

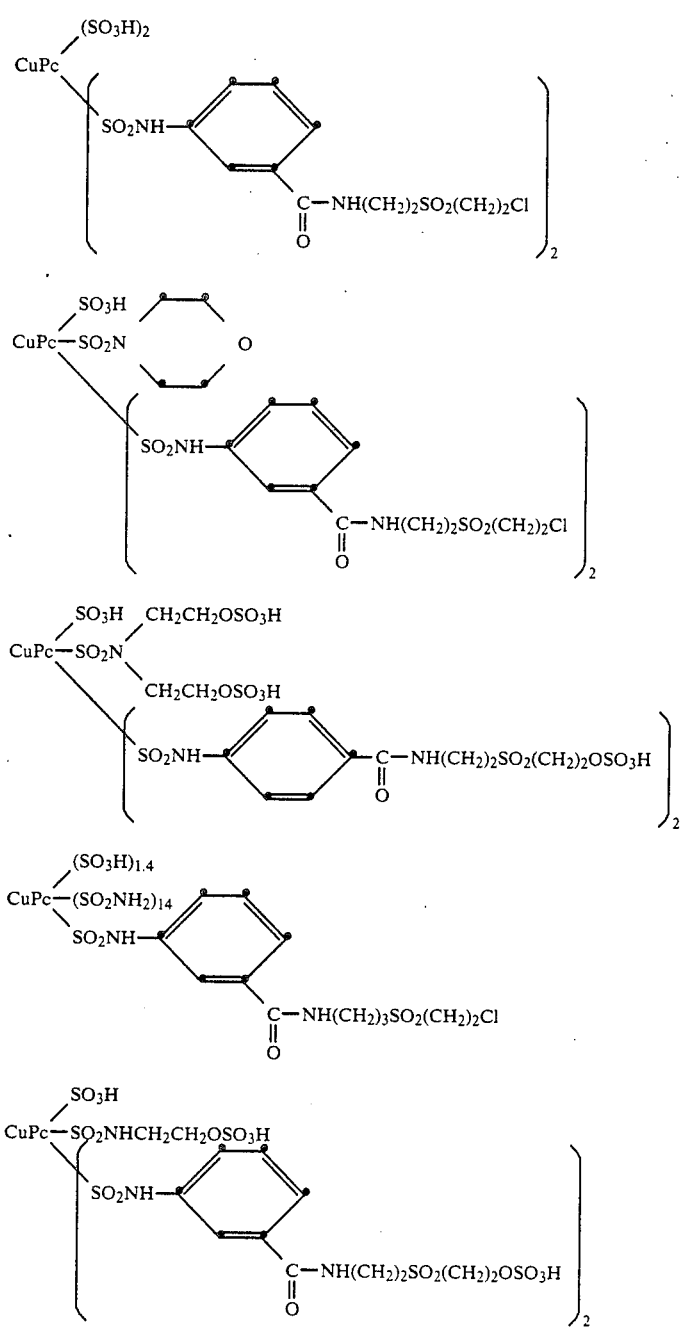

EXAMPLE 3

186 parts of 3-nitrobenzoyl chloride are dissolved at room temperature in 1,200 parts of nitrobenzene. 210 parts of β-(β-chloroethylsulfonyl)-ethylamine hydrochloride are then added. While stirring thoroughly and passing nitrogen over, the suspension is heated to 100° C. and is stirred at that temperature for about 3 hours (until 2 moles of HCl have been neutralized with sodium hydroxide solution). The result is a solution, which is then cooled down to room temperature, during which the product precipitates. It is filtered off and washed with methanolic solution until free of nitrobenzene. (Instead of by the methanolic treatment, the nitrobenzene can be removed by steam distillation.)

This gives 235 parts of analytically pure product of the following structure:

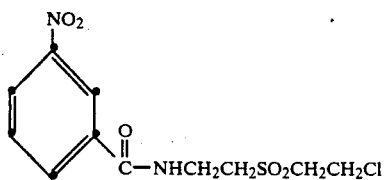

Analysis: theoretically chlorine covalent 11.%. found chlorine covalent 11.2%.

EXAMPLE 4

52 parts of 2′-aminoethyl-2-thioethanol are dissolved at room temperature in 600 parts of chloroform. 50 parts of sodium carbonate are then added at 10° to 20°. 74 parts of 3-nitrobenzoyl chloride, dissolved in 200 parts of chloroform, are then added dropwise (slight exothermic reaction), which is followed by stirring at room temperature for 1 hour. A further 50 parts of sodium carbonate are then added and allowed to react at room temperature for 12 hours. The sodium chloride formed is removed, and the chloroform is distilled off by means of a high vacuum. The residue is then oxidized by known methods with chlorine/hydrochloric acid mixture to the product mentioned in Example 3.

EXAMPLE 5

The same product is also obtained by replacing nitrobenzene for o-dichlorobenzene, trichlorobenzene, toluene or benzene etc.

EXAMPLE 6

Example 3 is repeated, except that 186 parts of 4-nitrobenzoyl chloride are used, affording the following product:

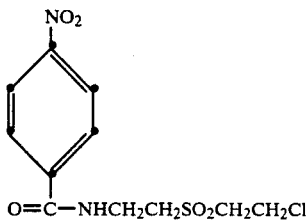

EXAMPLE 7

Example 3 is repeated, except that in place of 210 parts of β-(β-chloroethylsulfonyl)-ethylamine an equimolar amount of γ-(β-chloroethylsulfonyl)propylamine hydrochloride is used, affording the following product:

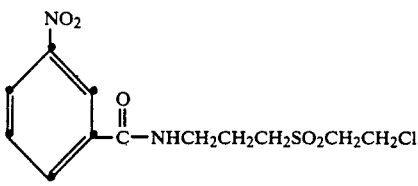

EXAMPLE 8

Example 3 is repeated, except that in place of 210 parts of β-(β-chloroethylsulfonyl)-ethylamine equimolar amounts of bis-[β-(β′-chloroethylsulfonyl)-ethyl]-amine hydrochloride are used, affording the following product:

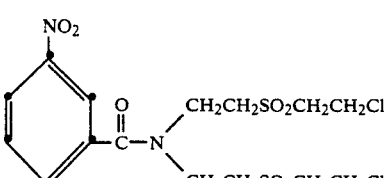

EXAMPLE 9

Example 6 is repeated, except that in place of 210 parts of β-(β′-chloroethylsulfonyl)-ethylamine equimolar amounts of bis-[β-(β′-chloroethylsulfonyl)-ethyl]-amine hydrochloride are used, affording the following product:

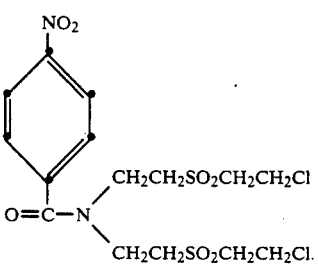

The same method as described in Examples 3 to 9 can be used to synthesize the intermediates of the following formulae.

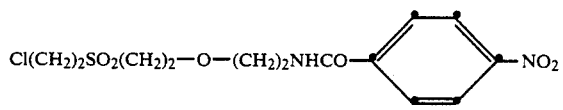

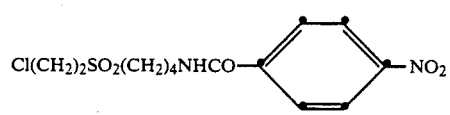

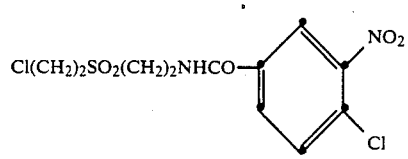

-continued

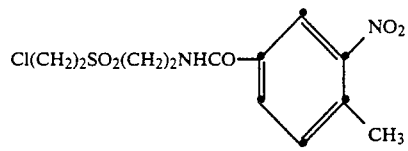

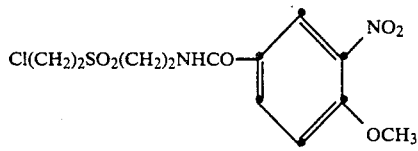

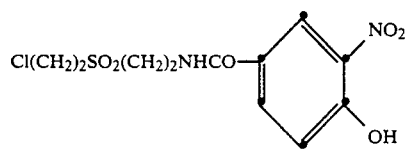

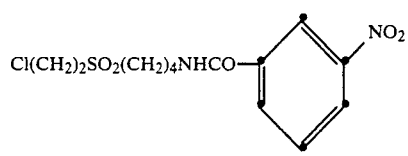

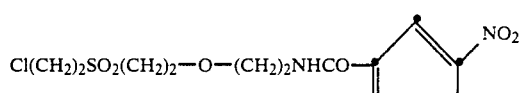

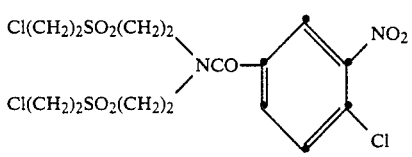

-continued

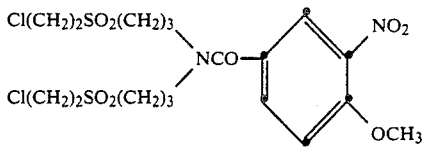

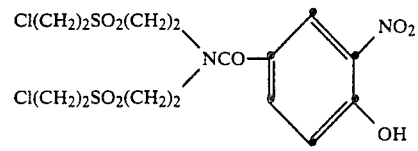

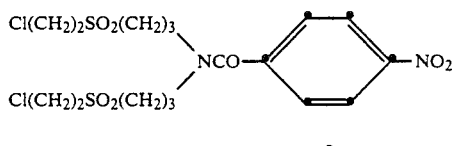

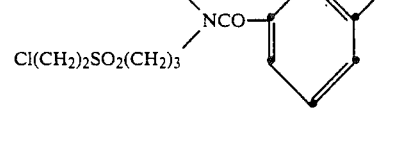

The intermediates described in Examples 3 to 9 and mentioned at the end of Example 9 are catalytically hydrogenated in alcohol, ethyl acetate or tetrahydrofuran at room temperature to about 40° C. with Pd/carbon or reduced with Fe/hydrochloric acid or Fe/acetic acid. In the course of the hydrogenation or reduction, the nitro group turns into a —NH$_2$ group. The amines thus obtained are used according to the invention as starting compounds for preparing the reactive dyes of formula (1).

EXAMPLE 10

Sulfation of the compound

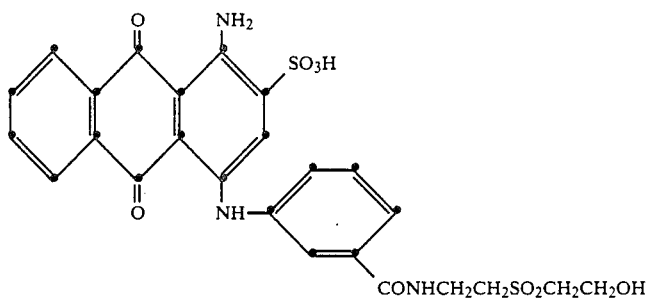

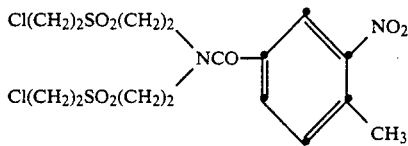

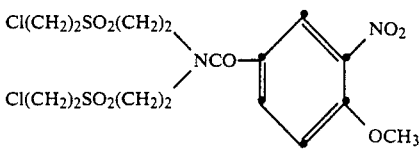

A reaction vessel is charged with 55 parts by volume of dry pyridine, and at 0° to 5° C. 2 parts by volume of chlorosulfonic acid are added dropwise at that temperature. 8.3 parts by weight of the thoroughly dried dye of the formula I are then sprinkled in, which is followed by stirring at room temperature overnight. The reaction material is then freed from pyridine at 70° C. in a rotary evaporator. The residue is taken up in 150 parts by volume of water and is salted out with 15% of sodium chloride. The dye is filtered off, is washed with 15% sodium chloride solution and is dried. The dye obtained has the formula

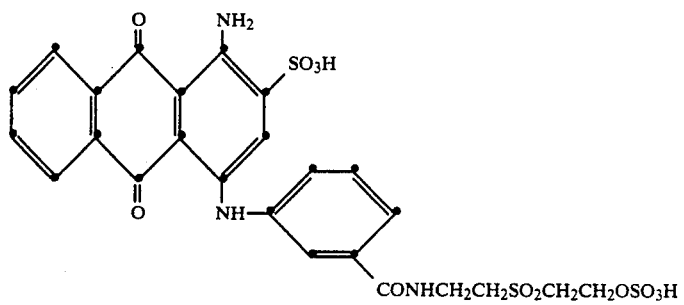

II and, according to HPLC, is uniform.

The same method can be used to prepared the dye of the formula

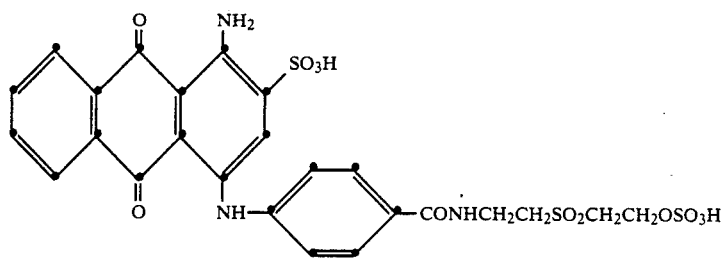

by repeating Example 1 using the isomeric para-compound

The same method can be used to prepare the following dyes, any insufficient alkaline liquor solubility of which can be significantly improved by adding anthraquinone-2-sulfonic acid and, if desired, dispersants.

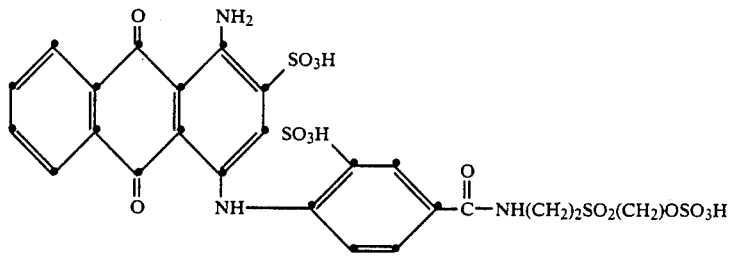

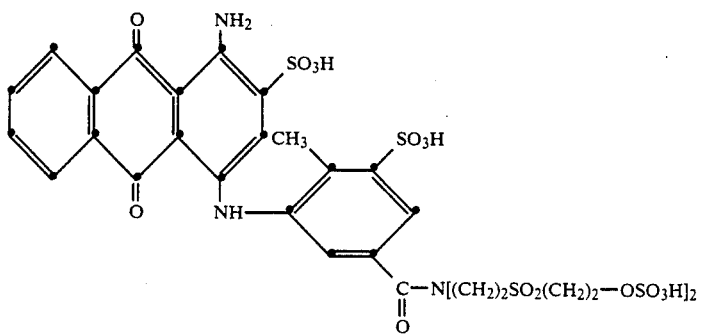

-continued
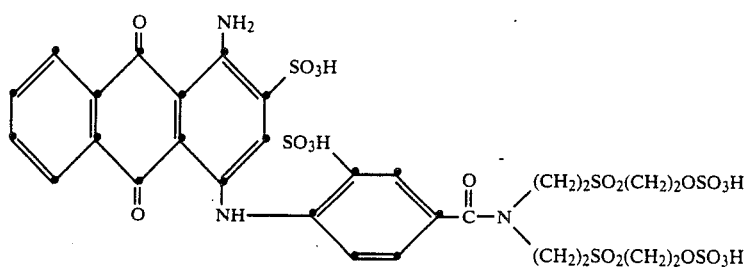
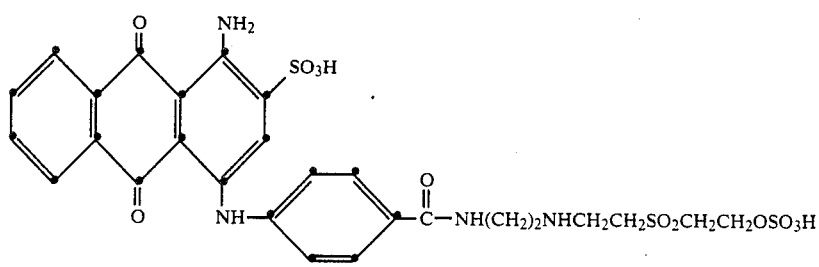
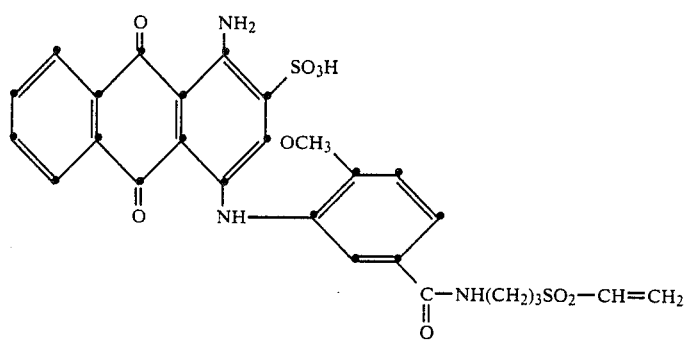
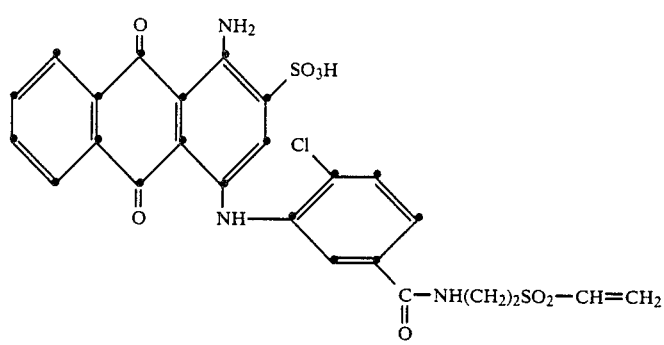
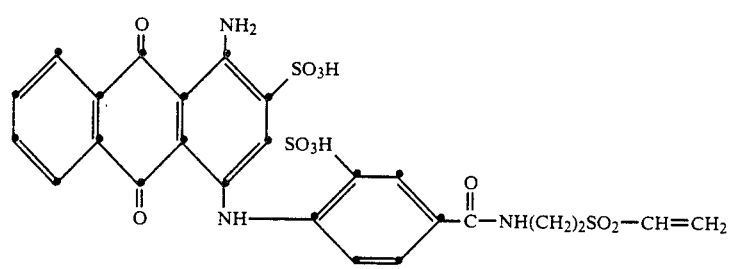

-continued

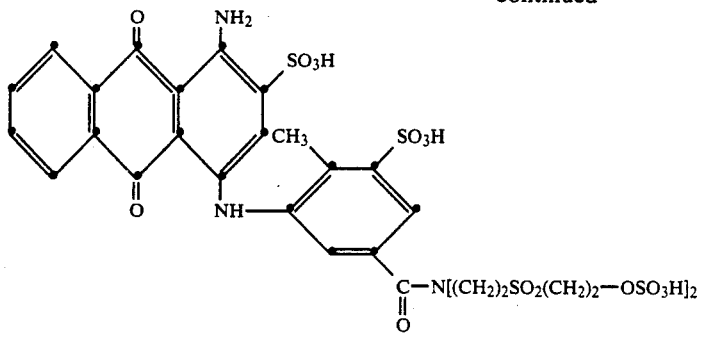

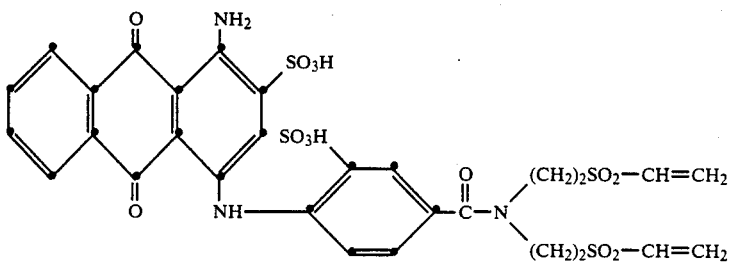

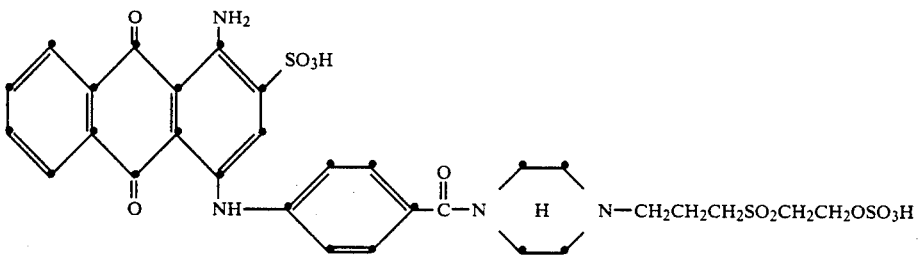

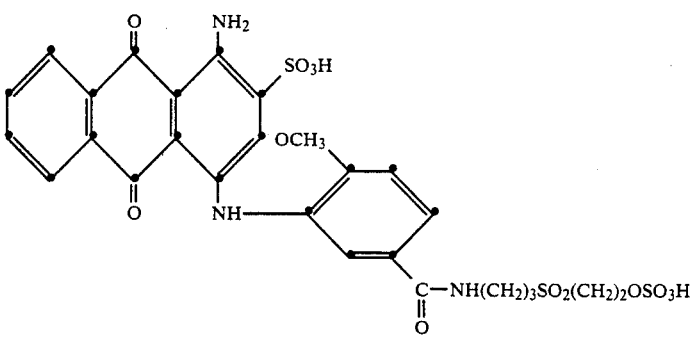

EXAMPLE 11

Preparation of a compound of the formula

I

In a plane ground joint vessel, 43 parts by weight of 2-mercaptoethanol (=0.55 mole) are treated with 110 parts by volume of 30% sodium hydroxide solution (=1.1 moles), and the temperature rises to 50° C. At that temperature a solution of 63.8 g of 2-chloroethylamine hydrochloride (=0.55 mole) in 38 parts by volume of water is added dropwise in the course of 2 hours. To the resulting thioether of the formula $$H_2N-CH_2CH_2-S-CH_2CH_2OH \qquad II$$

a solution of 92.8 parts by weight of 4-nitrobenzoyl chloride (=0.5 mole) in 120 parts by volume of toluene and simultaneously therewith 50 parts by volume of 30% sodium hydroxide solution (=0.5 mole) are added dropwise with thorough stirring in the course of 1½ hours. The final pH is 9 and an emulsion is present, the main content of which conforms to the formula

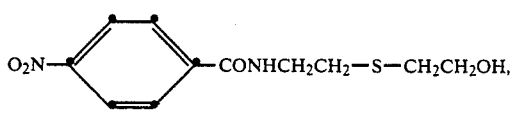
III

This is followed by oxidation in the same vessel to the sulfone: the reaction material is first brought to pH 5.0 with glacial acetic acid and has added to it 0.2 g of tungstic acid. 53 parts by volume of 35% hydrogen peroxide (=0.6 mole) are then added dropwise, starting at room temperature, in the course of 30', during which the temperature is allowed to rise without cooling. The reaction temperature is then set to 85° C., and a further 53 parts by volume of hydrogen peroxide (=0.6 mole) are then added dropwise in the course of 2 h. With a little KI starch mixed in, the mixture is subsequently stirred at 85° C. for 6 h. The toluene phase is then separated off and discarded. The product of the formula

IV crystallizes in the water phase and is filtered off at room temperature, washed with water and then dried. The yield, based on p-nitrobenzoyl chloride, is 94%, and purity is high.

The product obtained is catalytically hydrogenated at 45° C. in ethanol with Pd/C 5%. The concentrated reaction material crystallizes in the course of one day. The amine of the formula

V is present. Melting point 148°–149° C.

89 parts by weight of amine of the formula V, thoroughly dried and finally powdered, are stirred at between 30° and 40° C. into 80 parts by volume of 25% oleum in the course of 45', and the viscous material is subsequently stirred at 45° C. for 6 h. After discharge onto 900 parts by weight of ice-water the crystallization takes place spontaneously. The precipitate is filtered off and washed with acetone until free of sulfuric acid and dried. The yield is almost quantitative. The product conforms to the formula I.

EXAMPLE 12

The preparation of the compound of the formula

is effected as described in the preceding example, except that p-nitrobenzoyl chloride is replaced by m-nitrobenzoyl chloride.

The same procedure can be used to prepare the following intermediates:

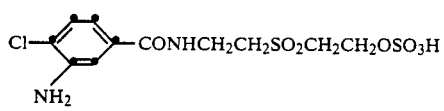

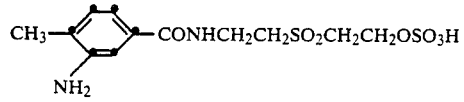

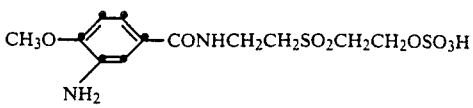

EXAMPLE 13

Example concerning the preparation of the dye of the formula

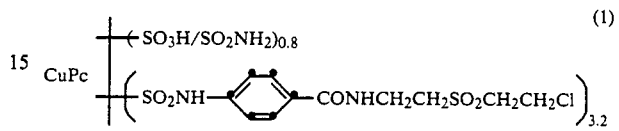
(1)

A reaction vessel is charged at 25° C. with 285 parts by volume of chlorosulfonic acid and at that temperature 60 parts by weight of Cu-phthalocyanine pigment are added a little at a time (≐0.1 mole). This is followed by 1 hour's stirring at 70° to 75° C., and the temperature is then raised to 130° to 135° C. in the course of 1 hour and that temperature is maintained for 5 hours. 125 parts by volume of thionyl chloride are then added dropwise at 70° to 75° C. in the course of 45', which is followed by stirring at 70° to 75° C. for 1 hour and at 85° to 95° C. for a further hour. After cooling down to room temperature, the reaction material is discharged dropwise onto ice while the temperature should not exceed 0° C. Filtration is followed by a thorough wash with ice-water to remove the sulfuric acid. The compacted material conforms to the product of the formula $CuPc(SO_2Cl)_4$   II The paste is homogenized in 500 parts by volume of ice-water, and 130.8 parts by weight of the amine of the formula

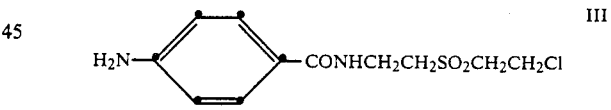
III are added. The suspension is then brought with 2N ammonia to a constant pH of 5.0, and is condensed at 50° C. and pH 5.0 for 18 hours. A suspension is present throughout. After filtration of the dye the uncondensed amine of the formula III is quantitatively determined in the filtrate by means of nitrite titration and HPLC. The formula is found to conform to I. The dried dye is milled in a glass ball mill in an aqueous medium to which 2% of a commercially available ligninsulfonate dispersant have been added.

The homogeneous dispersion, on application by dyeing method V, gives level dyeings of high degrees of fixation and in particular excellent application properties.

On using in place of the compound of the formula III the sulfatoester product from Example 11, formula I, this analogously and repeatedly gives a readily water-soluble phthalocyanine dye of the formula having similarly favorable dyeing properties.

EXAMPLE 14

The amine in Example 11, formula I, can be replaced by the meta-isomer of the formula

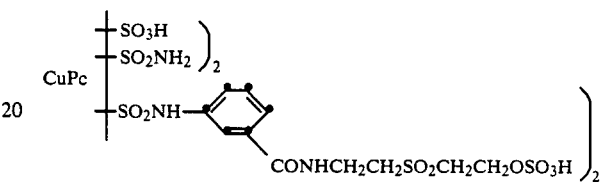

(from Example 12) in Example 13 as a component in the condensation, affording degrees of condensation which are higher than in the case of the para-product.

The use of 2 equivalents of the amine of the formula I (Example 14) gives a product of the average formula

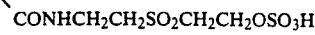

This dye is very readily water-soluble. On application by dyeing recipe V, it gives high degrees of fixation and excellent build-up values.

The following amines are condensed analogously to Example 13:

| Amine | CuPc dye |
|---|---|
| 1 equivalent of $H_2N$—⟨phenyl⟩—CON—$(CH_2CH_2SO_2CH_2CH_2Cl)_2$ | $CuPc \begin{cases} -SO_3H \\ -SO_2NH_2 \end{cases}_3 -SO_2NH$—⟨phenyl⟩—$CON(CH_2CH_2SO_2CH_2CH_2Cl)_2 \Big]_1$ |
| 2 equivalents of $H_2N$—⟨phenyl⟩—CON—$(CH_2CH_2SO_2CH_2CH_2Cl)_2$ | $CuPc \begin{cases} -SO_3H \\ -SO_2NH_2 \end{cases}_2 -SO_2NH$—⟨phenyl⟩—$CON(CH_2CH_2SO_2CH_2CH_2Cl)_2 \Big]_2$ |
| 1.5 equivalents of $H_2N$—⟨phenyl with CONHCH_2CH_2SO_2CH_2CH_2Cl at both meta positions⟩ | $CuPc \begin{cases} -SO_3H \\ -SO_2NH_2 \end{cases}_{2.5} -SO_2NH$—⟨phenyl with CONHCH_2CH_2SO_2CH=CH_2 groups⟩$\Big]_{1.5}$ |
| 2 equivalents of $H_2N$—⟨phenyl⟩—$CONHCH_2CH_2OCH_2CH_2SO_2CH_2CH_2Cl$ | $CuPc \begin{cases} -SO_3H \\ -SO_2NH_2 \end{cases}_{2.0} -SO_2NH$—⟨phenyl⟩—$CONHCH_2CH_2OCH_2CH_2SO_2CH=CH_2 \Big]_2$ |
| 2 equivalents of $H_2N$—⟨phenyl⟩—$CON\begin{cases} NCH_2CH_2SO_2CH_2CH_2Cl \\ NCH_2CH_2SO_2CH_2CH_2Cl \end{cases}$ | $CuPc \begin{cases} -SO_3H \\ -SO_2NH_2 \end{cases}_{2.0} -SO_2NH$—⟨phenyl⟩—$CON\begin{cases} NCH_2CH_2SO_2CH_2CH_2Cl \\ NCH_2CH_2SO_2CH_2CH_2Cl \end{cases}\Big]_2$ |

EXAMPLE 15
Ammonia as the base in the condensation as described in Example 13 can be replaced with advantage by the following amines:
H₂NCH₂CH₂OH
H₂NCH₂CH₂OCH₂CH₂OH
H₂NCG₂CH₂OCH₂CH₂OSO₃H
HN(CH₂CH₂OH)₂
HNCH₂CH₂OCH(CH₃)₂
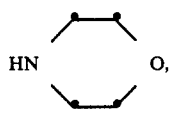
affording the following particularly valuable dyes:
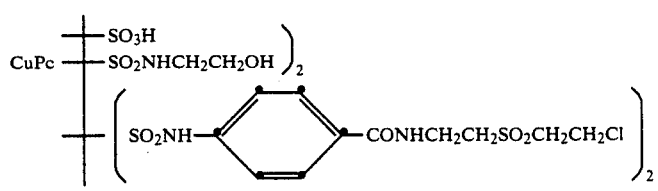
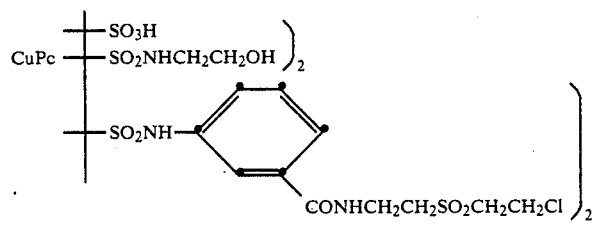
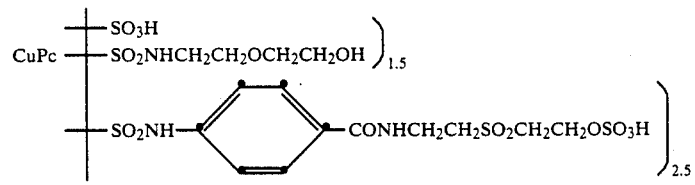
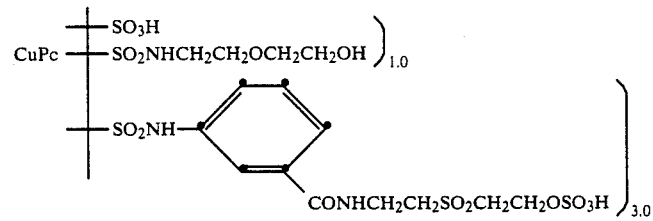
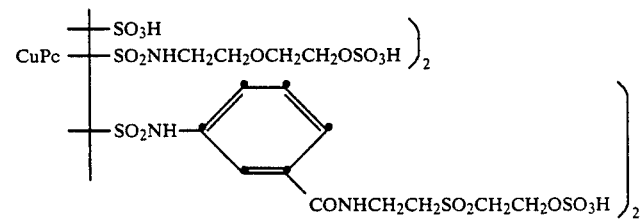
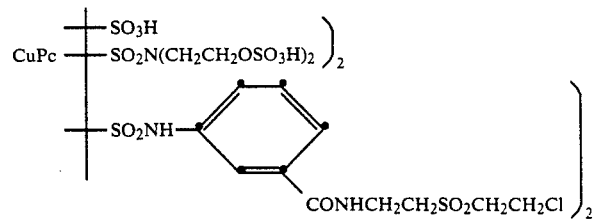

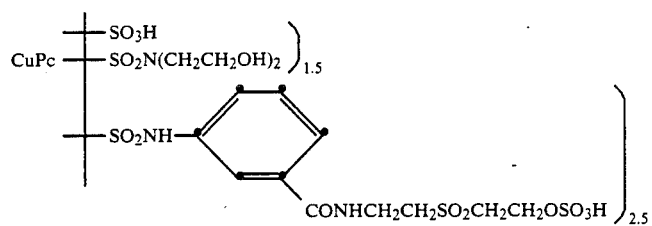
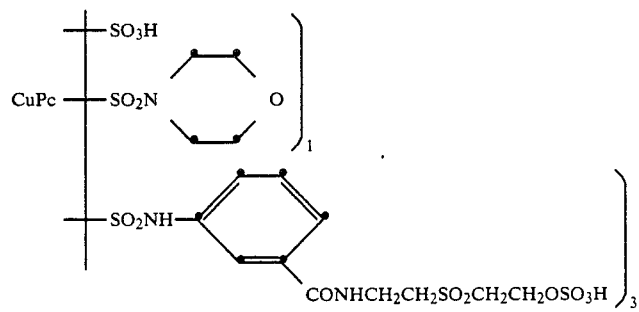
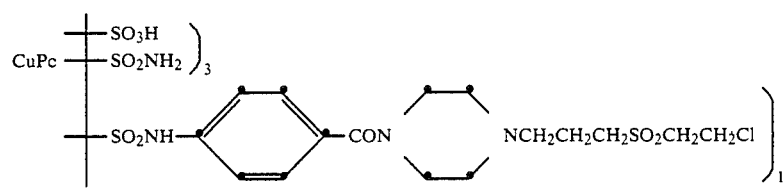
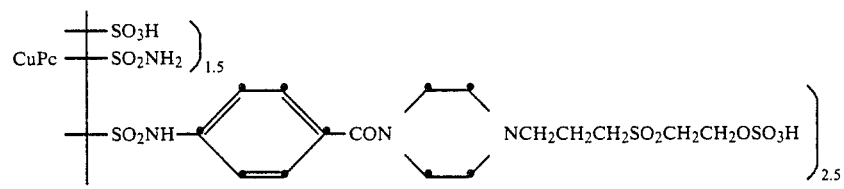
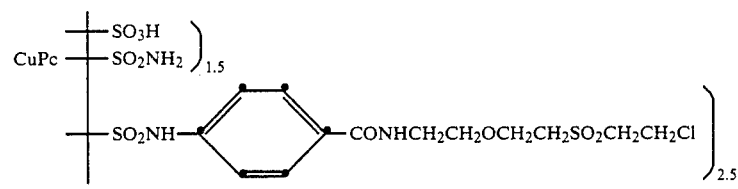
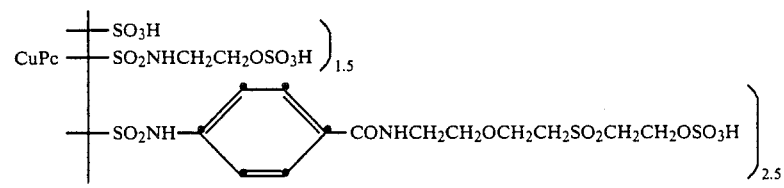
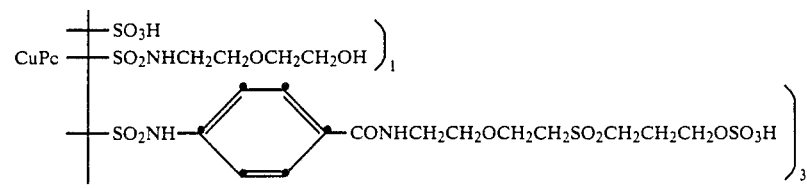

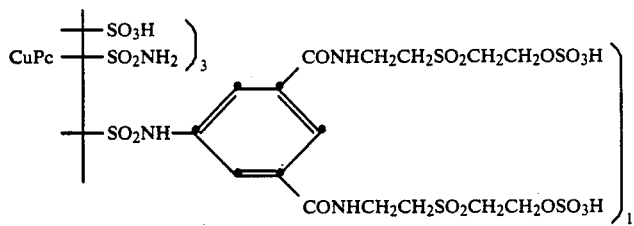
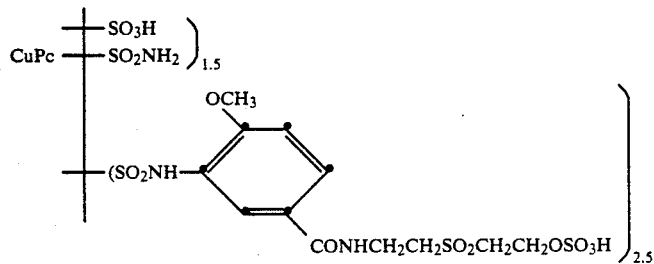
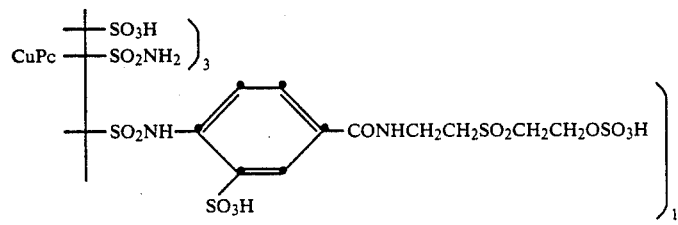
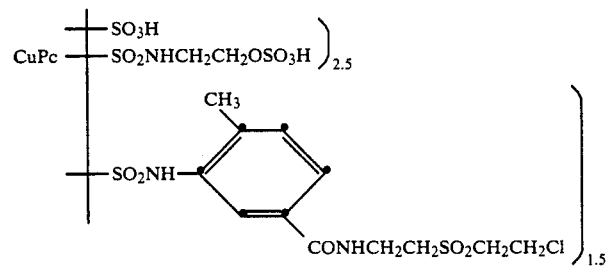
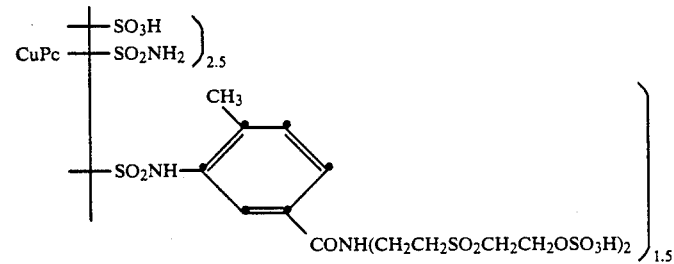
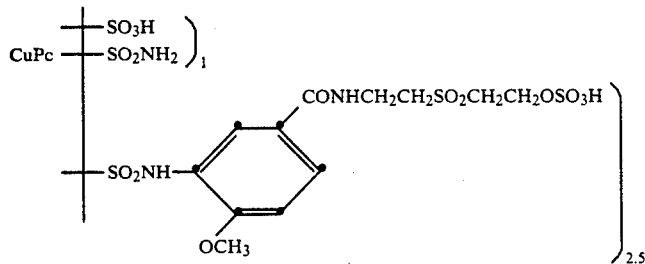

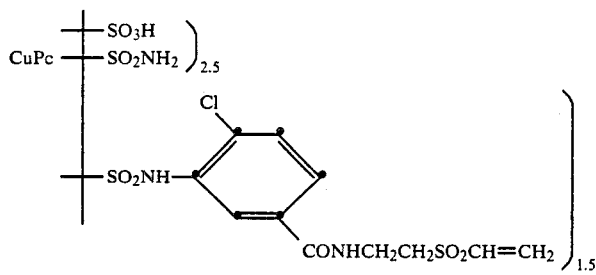

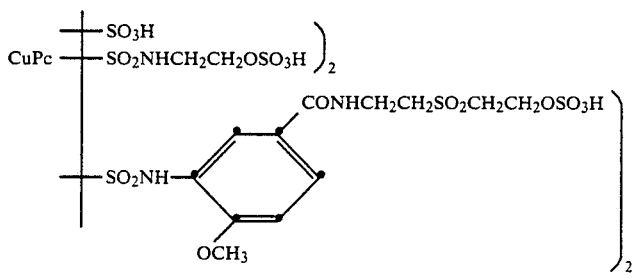

EXAMPLE 16

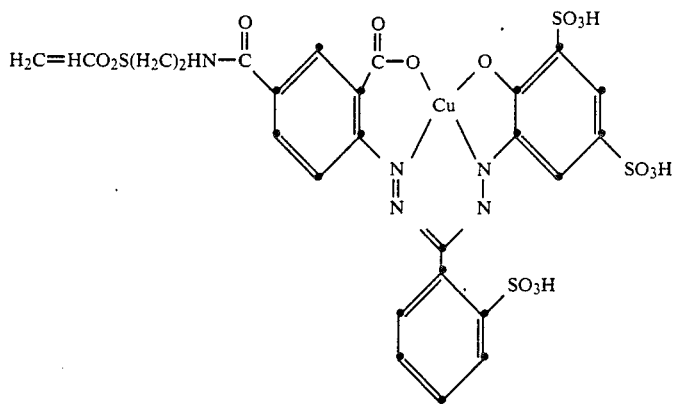

23.4 parts of 1'-β-(β'-chloroethylsulfonyl)-ethylcarbamoyl-3-carboxyl-4-aminobenzene are dissolved in 180 parts of water. 13 parts of concentrated hydrochloric acid are then added, which is followed by a diazotization at 0° C. with 175 parts of 4 N sodium nitrite. The suspension is then brought with sodium carbonate to pH 4.5. 12.95 parts of sodium sulfite and 7 parts of sodium pyrosulfite are then added. The temperature is then raised to 50° C. in the course of 30 minutes, which is followed by stirring for 2 hours at pH 6.0 and 50° to 55° C. Addition of 0.35 part of sodium dithionite is followed by 15 minutes of stirring at 30° C., and 11.2 parts of 32% hydrochloric acid are then added dropwise. 13.65 parts of benzaldehyde-2-sulfonic acid are then added in the course of about 10 minutes. Concentrated hydrochloric acid is then added in the course of 15 minutes until a pH of 1 to 1.5 is reached. 16 parts of sodium chloride are added to precipitate the resulting hydrazone, which is filtered off. The filter cake is presented as a press paste in 100 parts of water and thoroughly stirred. With maximum speed of stirring and very rapid addition of 30% sodium hydroxide solution a pH of 6.0 to 6.7 is set. 15 parts of copper(II) sulfate x 5 H₂O, dissolved in 40 parts of water, are then added in the course of 30 minutes, while at the same time a pH of 6.5 to 7.0 is maintained by adding 30% sodium hydroxide solution. An olive-green suspension forms. 16.1 parts of diazotized 2-aminophenol-4,6-disulfonic acid are then added in the course of 30 minutes while at the same the pH of 7.0 is maintained by adding about 20 parts of 30% sodium hydroxide solution, which is followed by stirring at room temperature and pH 7.0 for one hour. This is followed by vinylation at room temperature and pH 10.0 for 30 minutes. The pH is then adjusted to 6.5. The solution is clarified, and spray-drying gives a blue powder which, in addition to electrolyte, contains the sodium salt of the compound of the formula shown above. This compound produces by the dyeing methods customary for fiber-reactive dyes, on cotton and wool, greenish blue dyeings and prints having good all round fastness properties.

The procedure described in Example 16 can also be used to prepare the reactive dyes of the following formulae:

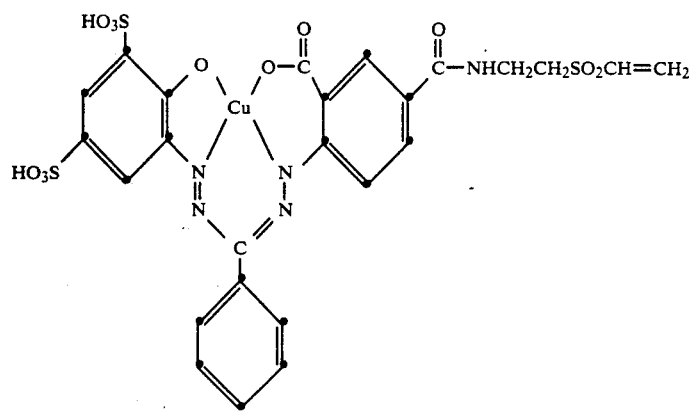
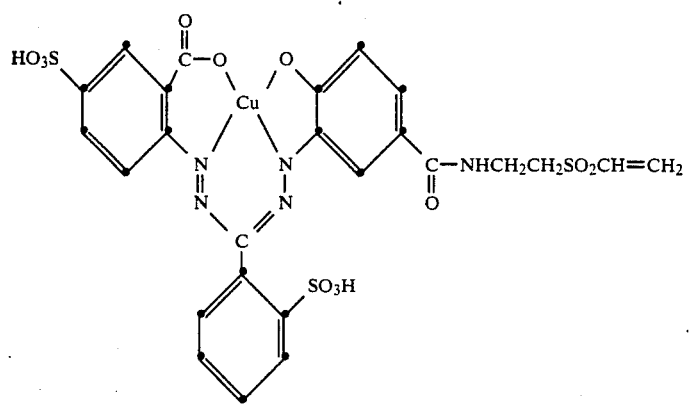
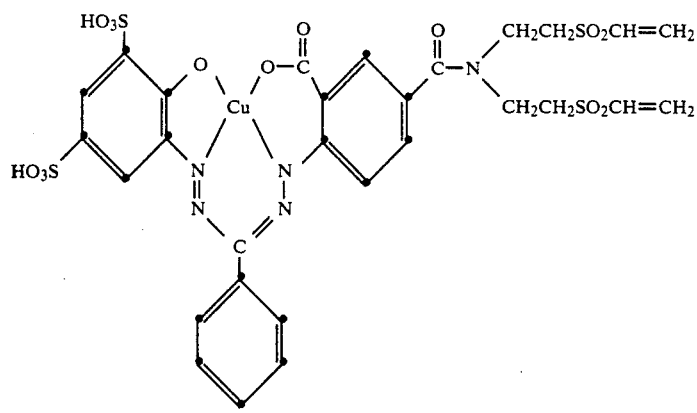
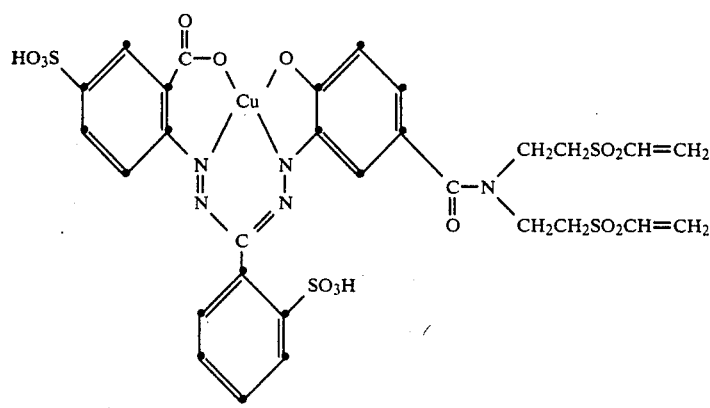

-continued
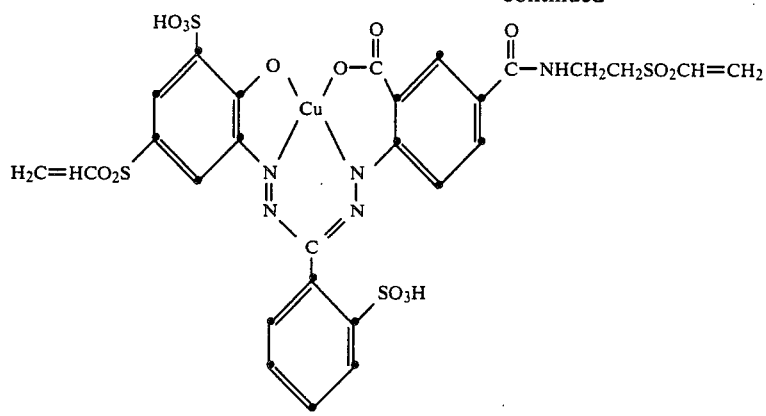
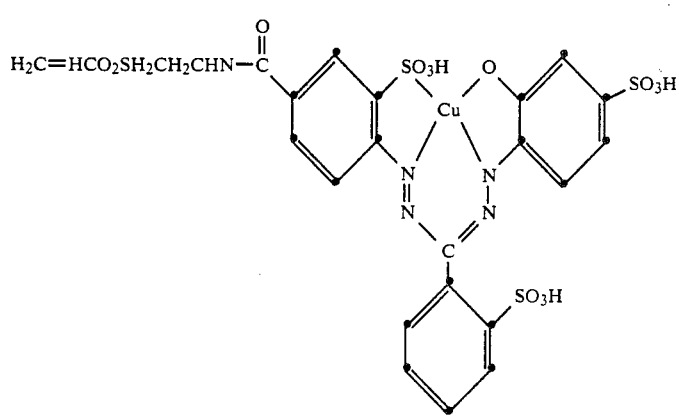
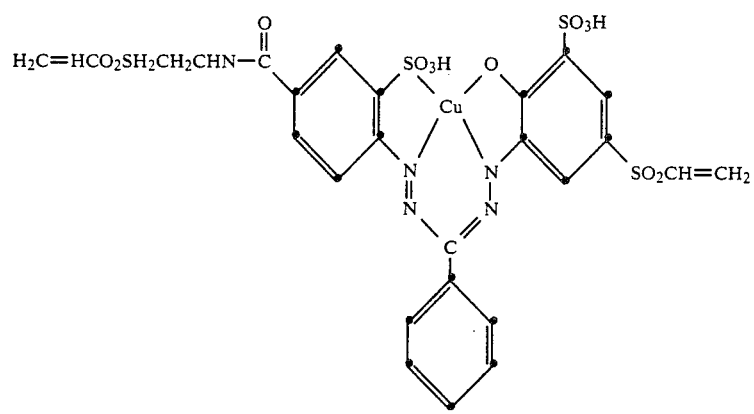
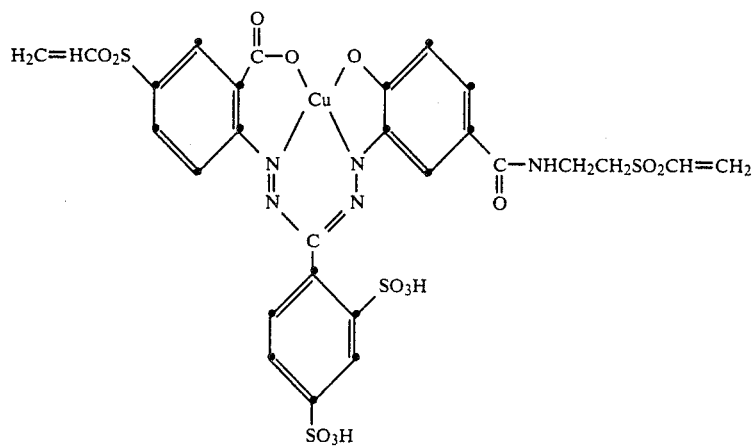

-continued
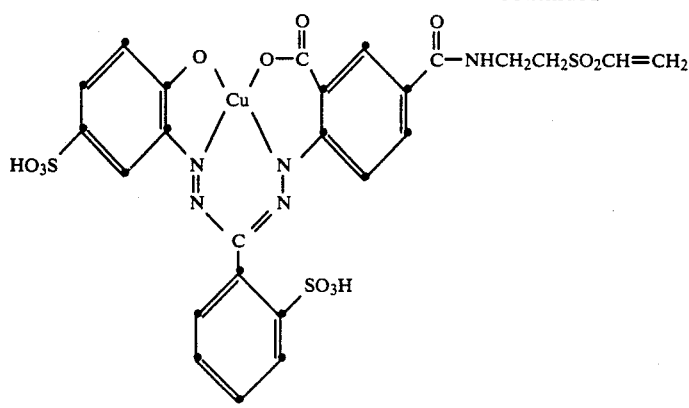
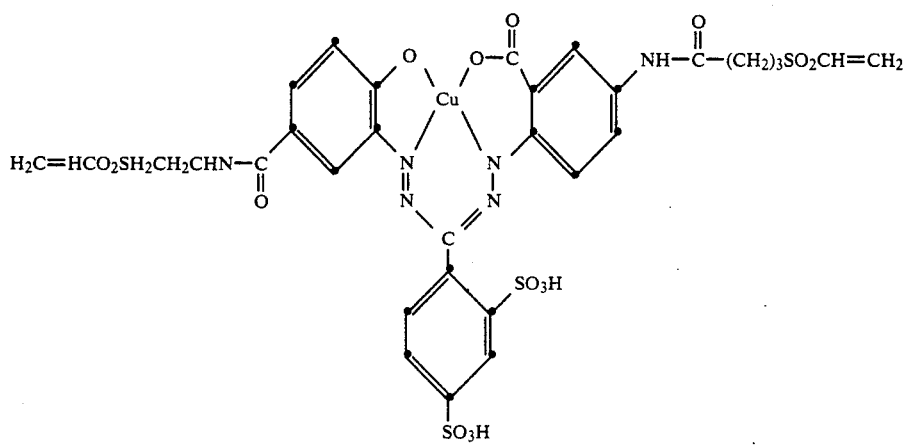
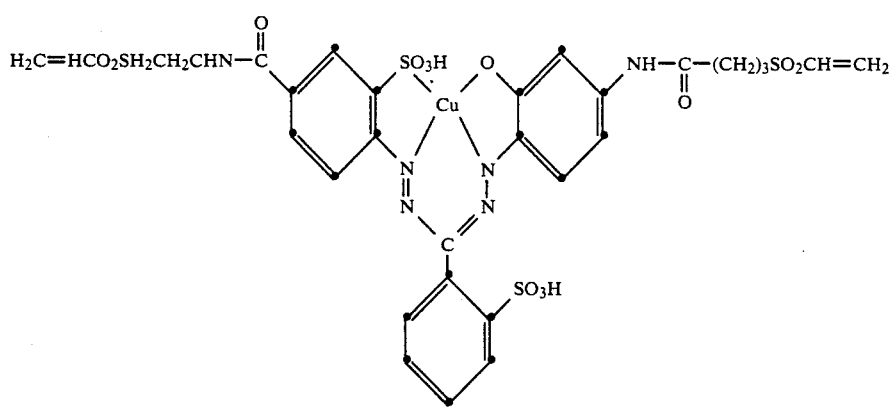
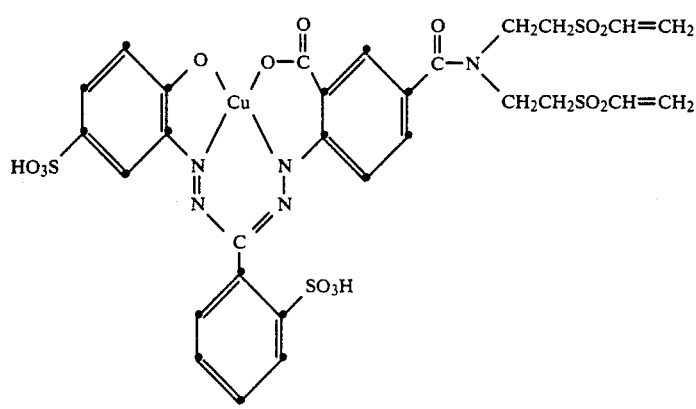

-continued
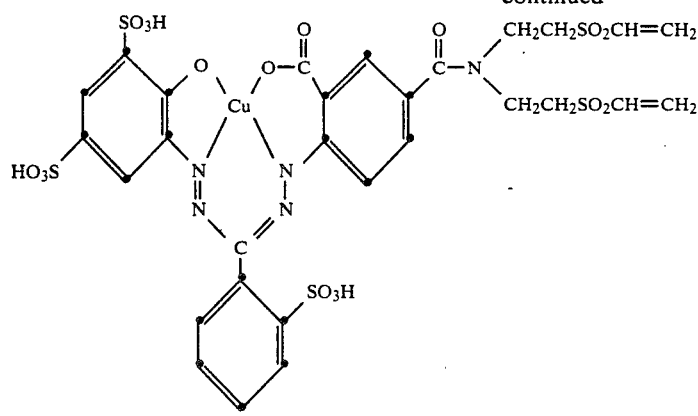
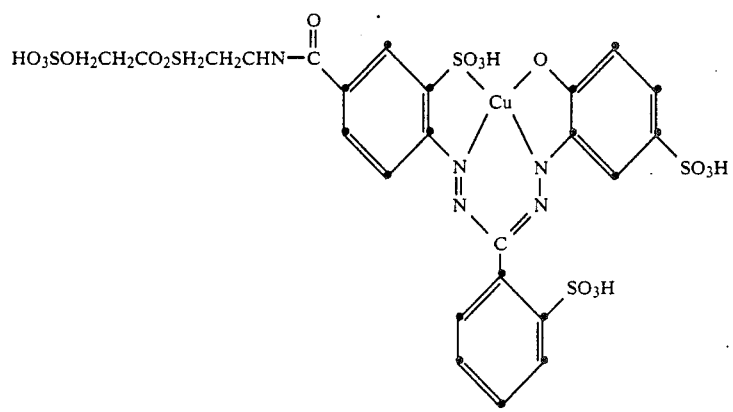
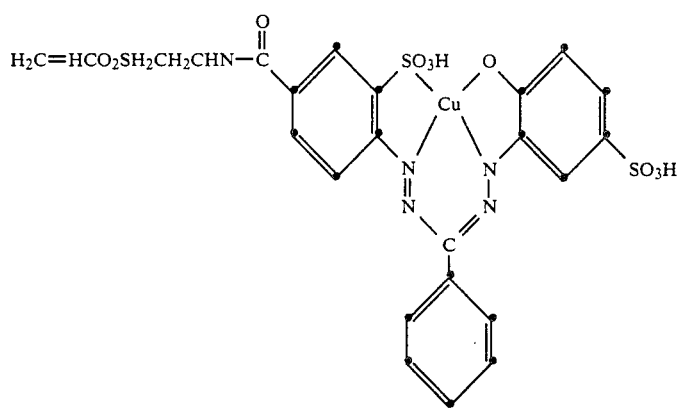
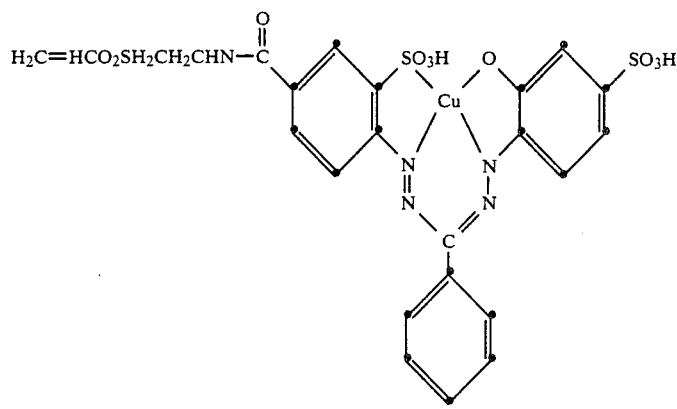

DYEING METHOD I 2 parts of the dye obtained in Example 1 are dissolved in 400 parts of water; to this solution are added 1,500 parts of a solution which contains per liter 53 g of sodium chloride. This dyebath is entered at 40° C. with 100 parts of a cotton fabric. After 45 minutes, 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

DYEING METHOD II 2 parts of the reactive dye obtained in Example 1 are dissolved in 400 parts of water; to this solution are added 1,500 parts of a solution which contains per liter 53 g of sodium chloride. This dyebath is entered at 35° C. with 100 parts of a cotton fabric. After 20 minutes, 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

DYEING METHOD III 8 parts of the reactive dye obtained in Example 1 are dissolved in 400 parts of water; to this solution are added 1,400 parts of a solution which contains per liter 100 g of sodium sulfate. This dyebath is then entered at 25° C. with 100 parts of a cotton fabric. After 10 minutes, 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

DYEING METHOD IV 4 parts of the reactive dye obtained in Example 1 are dissolved in 50 parts of water. To this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

DYEING METHOD V 6 parts of the reactive dye obtained in Example 1 are dissolved in 50 parts of water. To this solution are added 50 parts of a solution which contains per liter 16 g of sodium hydroxide and 0.04 liter of 38° Bé sodium silicate. The resulting solution is applied to a cotton fabric on a pad-mangle in such a way that its weight increases by 70%, and the fabric is then wound onto a beam. In this state the cotton fabric is left to stand at room temperature for 10 hours. The dyed fabric is then rinsed, is soaped off at the boil with a nonionic detergent for a quarter of an hour, is rinsed once more and is dried.

DYEING METHOD VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% solution of a nonionic detergent for a quarter of an hour, is rinsed and is dried.

PRINTING METHOD I 3 parts of the reactive dye obtained in Example 1 are sprinkled with high-speed stirring into 100 parts of stock thickening containing 50 parts of 5% sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is then dried, and the resulting printed fabric is steamed at 102° C. in saturated steam for 2 minutes. The printed fabric is then rinsed, if desired soaped off at the boil and rinsed once more, and is then dried.

PRINTING METHOD II 5 parts of the reactive dye obtained in Example 1 are sprinkled with high-speed stirring into 100 parts of a stock thickening containing 50 parts of 5% sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

We claim:

1. A fibre reactive dye of the formula

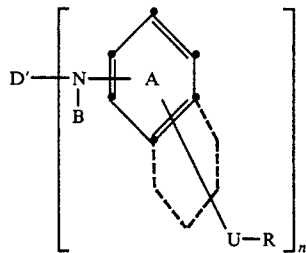

in which D' is the radical of an anthraquinone, phthalocyanine, formazane, azomethine, dioxazine, phenazine, stilbene, triphenylmethane, xanthene, thioxanthone, nitroaryl, naphthoquinone, pyrenequinone or perylenetetracarbimide dye; U is —CO—; R is a radical of the formula

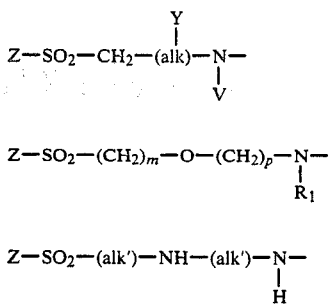

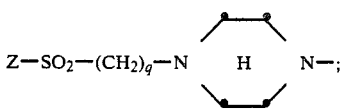

or

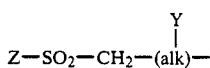

Z is sulfatoethyl, β-thiosulfatoethyl, β-phosphatoethyl, β-acetoxyethyl, β-halogenoethyl or vinyl; alk is a polymethylene radical having 1 to 6 C atoms or its branched isomers; Y is hydrogen, chlorine, bromine, fluorine, hydroxyl, sulfator, $C_1$-$C_4$alkanoyloxy, cyano, carboxyl, alkoxycarbonyl having 1 to 5 C atoms, carbamoyl or a radical —$SO_2$—Z in which Z is as defined above; V is hydrogen or $C_1$-$C_4$-alkyl which is unsubstituted or substituted by carboxyl, sulfo, $C_1$-$C_2$-alkoxy, halogen or hydroxyl; or a radical $$Z-SO_2-CH_2-(alk)-\overset{Y}{|}-$$

in which Z, alk and Y are as defined above; $R_1$ is hydrogen or $C_1$-$C_6$-alkyl; alk', independently of each other, are polymethylene radicals having 2 to 6 C atoms or their branched isomers; n is 1 to 4, m is 1 to 6, p is 1 to 6 and q is 1 to 6; B is hydrogen or alkyl having 1 to 4 carbon atoms which is unsubstituted or substituted by carboxyl, sulfo, cyano or hydroxyl; and the benzene or naphthalene radical A is further unsubstituted or is substituted by $C_1$-$C_4$-alkyl, $C_1$-$C_4$-alkoxy halogen hydroxyl carboxyl.

2. A fibre reactive dye according to claim 1, of the formula

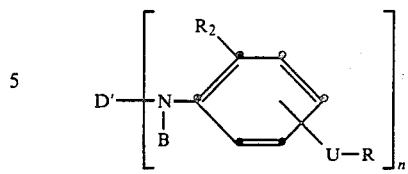

in which $R_2$ is hydrogen, $C_1$-$C_4$-alkyl, $C_1$-$C_4$-alkoxy, halogen, hydroxyl or carboxyl.

3. A fibre reactive dye according to claim 2, in which D' is the radical of a phthalocyanine dye.

4. A fibre reactive dye according to claim 1, in which D' is the radical of an anthraquinone dye of the formula

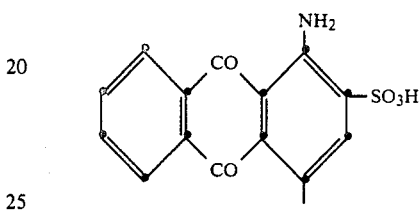

where the anthraquinone nucleus is further unsubstituted or is substituted by a further sulfo group.

5. A fibre reactive dye according to claim 3, in which D' is the radical of a phthalocyanine dye of the formula

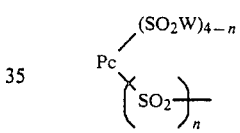

Pc is the radical of a copper or nickel phthalocyanine; W is —OH or —$NR_3R_4$; $R_3$ and $R_4$, independently of each other, are hydrogen or alkyl having 1 to 4 carbon atoms which is unsubstituted or substituted by hydroxyl, alkoxy, hydroxyalkoxy, sulfo, sulfato or sulfatoalkoxy, or in which —$NR_3R_4$ is a morpholino radical.

6. A fibre reactive dye according to claim 1, in which Z is a β-sulfatoethyl, β-chloroethyl or vinyl group.

7. A fibre-reactive dye according to claim 2, in which D' is the radical of an anthraquinone dye and Z is sulfatoethyl or vinyl.

8. A fibre-reactive dye according to claim 2, in which D' is the radical of an anthraquinone dye or phthalocyanine dye, $R_2$ is hydrogen and Z is sulfatoethyl or vinyl.

* * * * *

UNITED STATES PATENT AND TRADEMARK OFFICE
CERTIFICATE OF CORRECTION

PATENT NO. : 5,023,325
DATED : June 11, 1991
INVENTOR(S) : ATHANASSIOS TZIKAS ET AL.

It is certified that error appears in the above-identified patent and that said Letters Patent is hereby corrected as shown below:

On the cover page of the patent, the left-hand column, immediately following the section headed "Related U. S. Application Data" insert the following:

--[30]  Foreign Application Priority Data
   July 12, 1985 [CH] Switzerland...........3038/85-3 --.

In the ABSTRACT, change the first formula to read as follows:

$$-- \quad D-(-U-R)_n \quad --$$

Signed and Sealed this

First Day of December, 1992

Attest:

DOUGLAS B. COMER

*Attesting Officer*   *Acting Commissioner of Patents and Trademarks*